(12) United States Patent
Poosala et al.

(10) Patent No.: US 10,142,172 B2
(45) Date of Patent: Nov. 27, 2018

(54) INTERNET SERVICE PROVIDER MANAGEMENT PLATFORM

(71) Applicant: Facebook, Inc., Menlo Park, CA (US)

(72) Inventors: Viswanath Poosala, Menlo Park, CA (US); Philip Lewis Bohannon, Cupertino, CA (US); Maksim Kamenetsky, Palo Alto, CA (US); Debra Vaughn Hester, San Francisco, CA (US); Christopher Andrew Daniels, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 132 days.

(21) Appl. No.: 14/806,352

(22) Filed: Jul. 22, 2015

(65) Prior Publication Data

US 2017/0026231 A1 Jan. 26, 2017

(51) Int. Cl.
*H04L 12/24* (2006.01)
*H04L 29/06* (2006.01)
*H04W 4/24* (2018.01)
*H04L 12/66* (2006.01)
*H04L 12/14* (2006.01)
*H04M 15/00* (2006.01)
*H04L 12/813* (2013.01)

(52) U.S. Cl.
CPC ...... *H04L 41/0803* (2013.01); *H04L 12/1407* (2013.01); *H04L 41/0893* (2013.01); *H04L 63/029* (2013.01); *H04L 63/08* (2013.01); *H04L 63/20* (2013.01); *H04M 15/66* (2013.01); *H04W 4/24* (2013.01); *H04L 47/20* (2013.01)

(58) Field of Classification Search
CPC ......... H04L 41/12; H04L 45/02; H04L 45/00; H04L 45/04; H04W 84/18
See application file for complete search history.

(56) References Cited

U.S. PATENT DOCUMENTS

| 5,867,494 A * | 2/1999 | Krishnaswamy ... H04L 12/1485 370/352 |
| 6,151,628 A * | 11/2000 | Xu ........................ H04L 12/4633 709/225 |
| 6,512,916 B1 * | 1/2003 | Forbes, Jr. ............. H04W 16/18 455/67.16 |

(Continued)

*Primary Examiner* — Mark Rinehart
*Assistant Examiner* — Sanjay K Dewan
(74) *Attorney, Agent, or Firm* — FisherBroyles, LLP

(57) ABSTRACT

Some embodiments include an internet service provider (ISP) system capable of delegating network policy configuration tasks to ISP franchisee accounts. For example, the ISP system can establish, via a backhaul channel, a network tunnel from an access point hosting a local area network (LAN) to a gateway server connected to a wide area network (WAN). The ISP system can authenticate an ISP franchisee account operating a mobile device. The ISP franchisee account can configure, from the mobile device, a network usage policy associated with using the network tunnel, the gateway server, and/or application services available through the gateway server. The ISP system can authenticate a subscriber account operating a subscriber device to connect with the WAN from the LAN. The ISP system can enforce, at the gateway server, the network usage policy when the customer device is using the access point to access the WAN through the gateway server.

20 Claims, 17 Drawing Sheets

(56) References Cited

U.S. PATENT DOCUMENTS

| | | | | |
|---|---|---|---|---|
| 6,961,849 B1* | 11/2005 | Davis | G06F 21/6227 | 380/273 |
| 7,082,102 B1* | 7/2006 | Wright | H04L 41/0893 | 370/229 |
| 7,096,490 B2* | 8/2006 | Xiong | H04L 12/2859 | 370/254 |
| 7,340,748 B2* | 3/2008 | Vandewalle | G06Q 20/341 | 709/227 |
| 7,526,762 B1* | 4/2009 | Astala | G06F 8/33 | 709/203 |
| 7,593,366 B2* | 9/2009 | Sistla | H04W 4/24 | 370/254 |
| 7,602,796 B2* | 10/2009 | Scudder | H04L 45/02 | 370/392 |
| 7,694,054 B2* | 4/2010 | Grewal | G06F 21/6218 | 710/240 |
| 7,849,177 B2* | 12/2010 | Uhlik | H04L 12/14 | 709/223 |
| 7,860,978 B2* | 12/2010 | Oba | H04L 12/4633 | 709/200 |
| 7,920,572 B2* | 4/2011 | Bates | H04L 45/02 | 370/392 |
| 8,050,193 B2* | 11/2011 | Accetta | H04L 45/04 | 370/254 |
| 8,204,973 B2* | 6/2012 | Cuervo | H04L 41/044 | 370/254 |
| 8,332,495 B2* | 12/2012 | Lancaster | H04W 12/08 | 370/254 |
| 8,660,539 B2* | 2/2014 | Khambete | G06F 17/30699 | 370/310.2 |
| 8,681,658 B2* | 3/2014 | Chen | H04L 12/4641 | 370/223 |
| 8,717,931 B2* | 5/2014 | Taniuchi | H04L 12/5692 | 370/254 |
| 9,119,225 B2* | 8/2015 | Muhamed | H04W 28/16 | |
| 9,729,580 B2* | 8/2017 | Mattes | H04L 63/20 | |
| 2002/0138635 A1* | 9/2002 | Redlich | H04L 12/2856 | 709/229 |
| 2005/0002341 A1* | 1/2005 | Lee | H04L 41/046 | 370/254 |
| 2005/0088977 A1* | 4/2005 | Roch | H04L 12/4641 | 370/254 |
| 2008/0159316 A1* | 7/2008 | Dutta | H04W 84/18 | 370/406 |
| 2008/0232256 A1* | 9/2008 | Douglas | H04L 45/00 | 370/237 |
| 2008/0244086 A1* | 10/2008 | Patel | H04L 12/66 | 709/238 |
| 2011/0044353 A1* | 2/2011 | Foottit | H04L 12/5695 | 370/465 |
| 2012/0136927 A1* | 5/2012 | Dillon | G06F 17/30902 | 709/203 |
| 2013/0029708 A1* | 1/2013 | Fox | H04W 28/08 | 455/509 |
| 2013/0239181 A1* | 9/2013 | Varsavsky Waisman-Diamond | H04L 29/12367 | 726/4 |
| 2014/0115676 A1* | 4/2014 | Coghlan | H04W 12/06 | 726/6 |
| 2014/0126410 A1* | 5/2014 | Agarwal | H04W 24/02 | 370/252 |
| 2014/0321298 A1* | 10/2014 | Chow | H04L 41/083 | 370/252 |
| 2014/0373124 A1* | 12/2014 | Rubin | H04L 67/28 | 726/7 |
| 2015/0365288 A1* | 12/2015 | Van Der Merwe | H04L 41/5051 | 370/254 |
| 2016/0127889 A1* | 5/2016 | Cui | H04W 36/08 | 370/328 |
| 2016/0204987 A1* | 7/2016 | Gorajala Chandra | H04L 41/0803 | 370/254 |
| 2017/0302511 A1* | 10/2017 | Foster | H04L 41/0803 | |

* cited by examiner

US 10,142,172 B2

INTERNET SERVICE PROVIDER MANAGEMENT PLATFORM

BACKGROUND

Connecting rural areas to the power grid and/or the Internet can be difficult and can require a sizeable investment, e.g., by network operators, government agencies, and/or power utilities. For at least this reason, many people living in rural areas and/or developing nations often do not have access to network connectivity. People in these areas sometimes use mobile devices, e.g., low-end cellular telephone handsets ("low-end mobile devices") with limited computational capacity (e.g., slower processor) to achieve some amount of connectivity (e.g., to make phone calls). However, because of the unavailability of internet service providers (ISPs), these mobile devices lack the ability to access global information and application services provided by remote servers. Hence, there is a need to overcome the technical challenges to deploy an ISP platform across rural areas.

Figure 1:
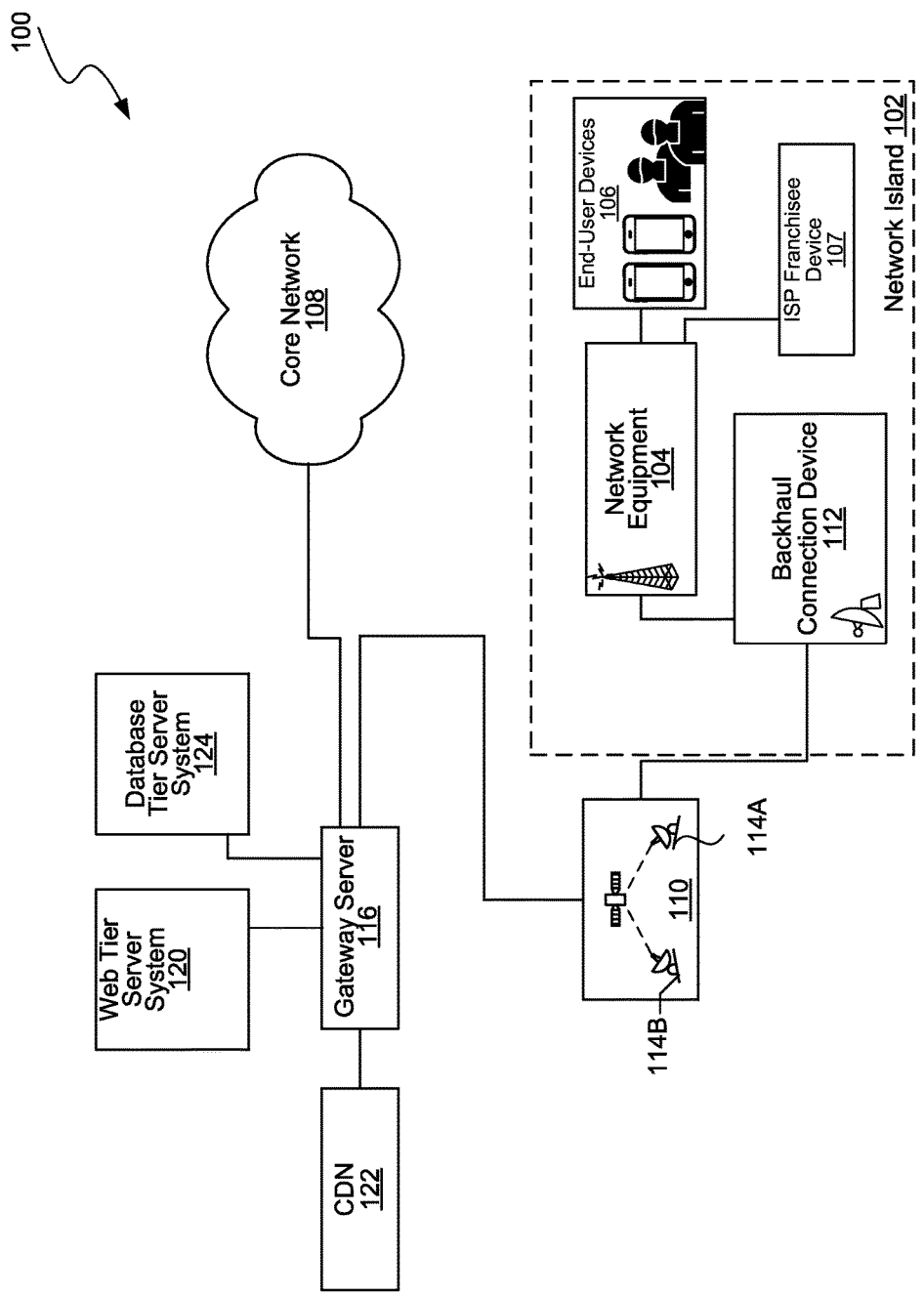
FIG. 1 is a block diagram illustrating a network system environment of a rural networking system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments include an Internet service provider (ISP) platform system enabling rural entrepreneurs (e.g., ISP franchisees) to individually set up local area networks (LANs), each with a secure tunnel to a gateway server that provides Internet access. The LANs of individual ISP franchisees can form a distributive ISP platform that is individually managed. In several embodiments, a rural entrepreneur can itself up as an ISP franchisee using an access point, a mobile device and a backhaul network connector.

The access point can setup a LAN. The access point can provide network coverage in its proximity. For example, the access point can provide Wi-Fi or cellular network coverage (e.g., 2G, 3G, 4G, LTE, or any combination thereof). The backhaul network connector can connect the LAN to an external network (e.g., a remote gateway server across a backhaul network channel). For example, the access point can setup a network tunnel to the remote gateway server. The gateway server can connect devices in the LAN to the Internet and application services provided by a web tier server system coupled to the gateway server. The mobile device running an ISP franchisee application enables the rural entrepreneur to inform the ISP platform system of its intention to become the ISP franchisee. In some embodiments, a mobile power source can be used to supply power to the backhaul network connector and the access point. The mobile power source can also charge the mobile device running the ISP franchisee application.

For example, the backhaul network connector can be a peer to peer antenna configured to communicate with one or more other peer to peer antennas. The access point can establish a network tunnel from the access point to the gateway server connected to at least one of the other peer to peer antennas. A network tunnel is established (e.g., from either side) via a tunneling protocol. The network tunnel enables a user of a network to access or provide a network service that the underlying network does not support or provide directly (e.g., the network tunnel enables devices in the LAN to access application services available to the network of the gateway server).

The gateway server can provide access to the Internet and application services for a subscriber device (e.g., authenticated by a subscriber account at the gateway server) and/or an ISP franchisee device (e.g., authenticated by an ISP franchisee account) in the LAN established by the access point. For example, the gateway server can provide access to a number of web or database services to a subscriber device, including for example, free basic services (e.g., weather services, health-related services, location-based services, encyclopedia or dictionary services, sport or entertainment services, messaging services, social network services, educational services, or any combination thereof), Internet access service, database services, subscriber account configuration service (e.g., for a subscriber account), franchisee account management service (e.g., for an ISP franchisee account), or any combination thereof. For example, the gateway server can generate and provide a subscriber portal enabling a subscriber to authenticate with the gateway server, access free basic services, review network usage status, and execute or request Internet service transactions.

The gateway server can also make a number of application services (e.g., web or database services) available to the ISP franchisee device. The ISP franchisee account can have the privileges and accessibility of a subscriber account and more. For example, the application services can include Internet service policy configuration service, subscriber management service (e.g., for managing subscriber accounts), network monitor and repair service (e.g., for managing network equipment, including access points and backhaul network connects), or any combination thereof. In several embodiments, the access point can communicate with the gateway server to authenticate itself and establish network connections on behalf of its subscribers. In some embodiments, the access point can provide to or receive feedback from the gateway server to enforce network usage policies. For example, the gateway server can generate and provide an ISP manager portal enabling an ISP franchisee account to monitor network usage of various subscribers and manage (e.g., monitor and/or edit) Internet service account balances (e.g., data plans) of the subscriber accounts. In some embodiments, a data plan granted by an ISP franchisee account to a subscriber account can be applied to an externally connectable LAN established by a different ISP franchisee account. In some embodiments, a data plan granted by an ISP franchisee account to a subscriber account can only be applied to externally connectable LANs established by the ISP franchisee account.

The disclosed ISP platform system advantageously enables local entrepreneurs to setup backhaul networks in rural areas. The disclosed ISP platform system can generate a subscriber portal and an ISP manager portal, both available via wireless connections (e.g., Wi-Fi connection or cellular connection). This paradigm enables a device that is connected a LAN to become an ISP for others connected to the LAN, thus establishing a distributive ISP platform.

FIG. 1 is a block diagram illustrating a network system environment of a rural networking system 100, in accordance with various embodiments. The rural networking system 100 can comprise a collection of network islands (e.g., a network island 102). Each of the network islands can be established by at least a network equipment 104. The network equipment 104 can be an access point, a cellular tower, a box, a router, or other electronic hardware for locally providing network connectivity. In some embodiments, one or more devices connected to the network equipment 104 can establish further sub-networks, and device connected to those sub-networks can establish yet further lower-level networks and so on.

The network equipment 104 can provide network connectivity (e.g., an externally connectable LAN) for end-user devices 106 (e.g., subscriber devices). For example, the network architecture of the network connectivity can be based on a mesh network or a star network. The end-user devices 106 are computing devices, including for example, mobile devices. For example, the end-user devices 106 can include personal computers, mobile phones, tablets, wearable devices, Internet of Things (IoT) devices, or any other mobile or stationary devices. The network connectivity amongst the end-user devices 106 can be established via a wireless protocol, e.g., long-term evolution (LTE), 3G, 2G, Wi-Fi, Wi-Fi Direct, WiMAX, Bluetooth, Bluetooth LE, or any combination thereof. The network connectivity can also be based on a wired protocol, e.g., a universal serial bus (USB) or Ethernet.

The rural networking system 100 enables the end-user devices 106 to connect with a core network 108, e.g., the Internet, a wide area network (WAN), or other regional network. For example, the network equipment 104 may be connected to a backhaul network system 110 via a backhaul connection device 112. In turn, the backhaul network system 110 can be connected to the core network 108. The backhaul network system 110 establishes a backhaul network channel, which is a transmission medium that provides connectivity between its endpoints continuously or non-continuously. For example, the backhaul network channel may cease to function for a time according to a schedule or sporadically. For example, the backhaul network system 110 can be implemented by a train, a drone, a satellite, a ship, or any combination thereof. The backhaul network system 110 can include a subscriber side antenna 114A and a gateway side antenna 114B. Some examples of the backhaul network system 110 or illustrated in FIGS. 2A-2C.

At least one of the end-user devices 106 can be configured as an ISP franchisee device 107. The ISP franchisee device 107 can include and be configured by an ISP franchisee application. The ISP franchisee application enables the user of the ISP franchisee device 107 to control, at least partially, network usage of the network equipment 104 and/or the backhaul network system 110. The ISP franchisee application can also control the use of application services and Internet connectivity available via the backhaul network system 110. For example, the ISP franchisee application can set up network usage policies and/or data plans.

In some embodiments, the network equipment 104 can provide continuous connectivity amongst the end-user devices 106 in the network island 102 and continuous or non-continuous connectivity between the end-user devices 106 to the core network 108. The network equipment 104 may also be connected to other network islands. For example, the network equipment 104 may be connected to another network equipment, and therefore, other end-user devices in another network island established by the other network equipment.

On the gateway side of the backhaul network system 110, a gateway server 116 can be connected to the backhaul network system 110. For example, the gateway side antenna 114B can be connected to a network adapter (e.g., in the backhaul network system 110) that passes the received wireless data signals via an interconnection line (e.g., an optical fiber or Ethernet cable) to the gateway server 116. The network equipment 104 may establish a network tunnel to the gateway server 116. Through the gateway server 116, the end-user devices 106 can be exposed to various application services and the core network 108.

In some embodiments, the gateway server 116 can be an ISP edge point of presence (POP). For example, the gateway server 116 can be connected to the core network 108, a web tier server system 120, a content delivery network (CDN) 122, a database tier server system 124, or any combination thereof. The web tier server system 120 can provide dynamic content in response to service requests from the end-user devices 106, including generating a link to a static content object in the CDN 122 or the core network 108. For example, the web tier server system 120 can provide one or more application services that are accessible by one or more specialized mobile applications or one or more browser applications in the end-user devices 106. In some embodiments, at least some of the application services provided by the web tier server system 120 are only available to the ISP franchisee device 107. In some embodiments, at least some of the application services provided by the web tier server system 120 are available only to the end-user devices 106 authenticated as corresponding to subscriber accounts. In some embodiments, the web tier server system 120 is directly connected to the gateway server 116 by a high bandwidth network line.

The CDN 122 is a system of distributed servers that deliver webpages and other web content to a user based on the geographic locations of the user. The CDN 122 can be specific to an application service or a group of application services (e.g., application services for a social networking system). The CDN 122 can cache static content for the application service or the group of application services. The database tier server system 124 can provide one or more database services.

The gateway server 116 and/or the network equipment 104 can enforce one or more network usage policies. In some embodiments, at least some of the network usage policies are specific to subscriber accounts. For example, a network usage policy for a subscriber account can include a data plan specifying network usage capacity within a time window. The network usage policies can be configured by ISP franchisee accounts. For example, the web tier server system 120 can provide an ISP manager portal to ISP franchisee accounts (e.g., operating the ISP franchisee device 107). The ISP manager portal can enable the ISP franchisee account operating the ISP franchisee device 107 to configure one or more network usage policies of subscriber accounts operating the end-user devices 106.

For example, an ISP account user can login to the gateway server 116 via the ISP franchisee device 107 to access application services (e.g., including the ISP manager portal) provided by the web tier server system 120. The franchisee ISP account can modify a network usage policy (e.g., a data plan or a usage policy associated with the data plan) associated with a subscriber account. In one example, the ISP account user can change the bandwidth restrictions to an end-user device authenticated by the subscriber account. In one example, the ISP franchisee account can add, modify or remove a data plan (e.g., to increase or reduce network usage capacity available to the subscriber account when accessing the gateway server 116. In another example, where the ISP franchisee account is registered as the owner of the network equipment 104, the ISP franchisee account can change the bandwidth restrictions associated with all subscriber accounts that login through the network equipment 104.

In some embodiments, at least some of the application services and functionalities in the web tier server system 120 can instead be implemented in the gateway server 116. In some embodiments, at least some of the functionalities in the gateway server 116 can be implemented in the network equipment 104, when appropriate. In some embodiments, at least some of the functionalities in the gateway server 116 can be implemented in the web tier server system 120, when appropriate.

Figure 2A:
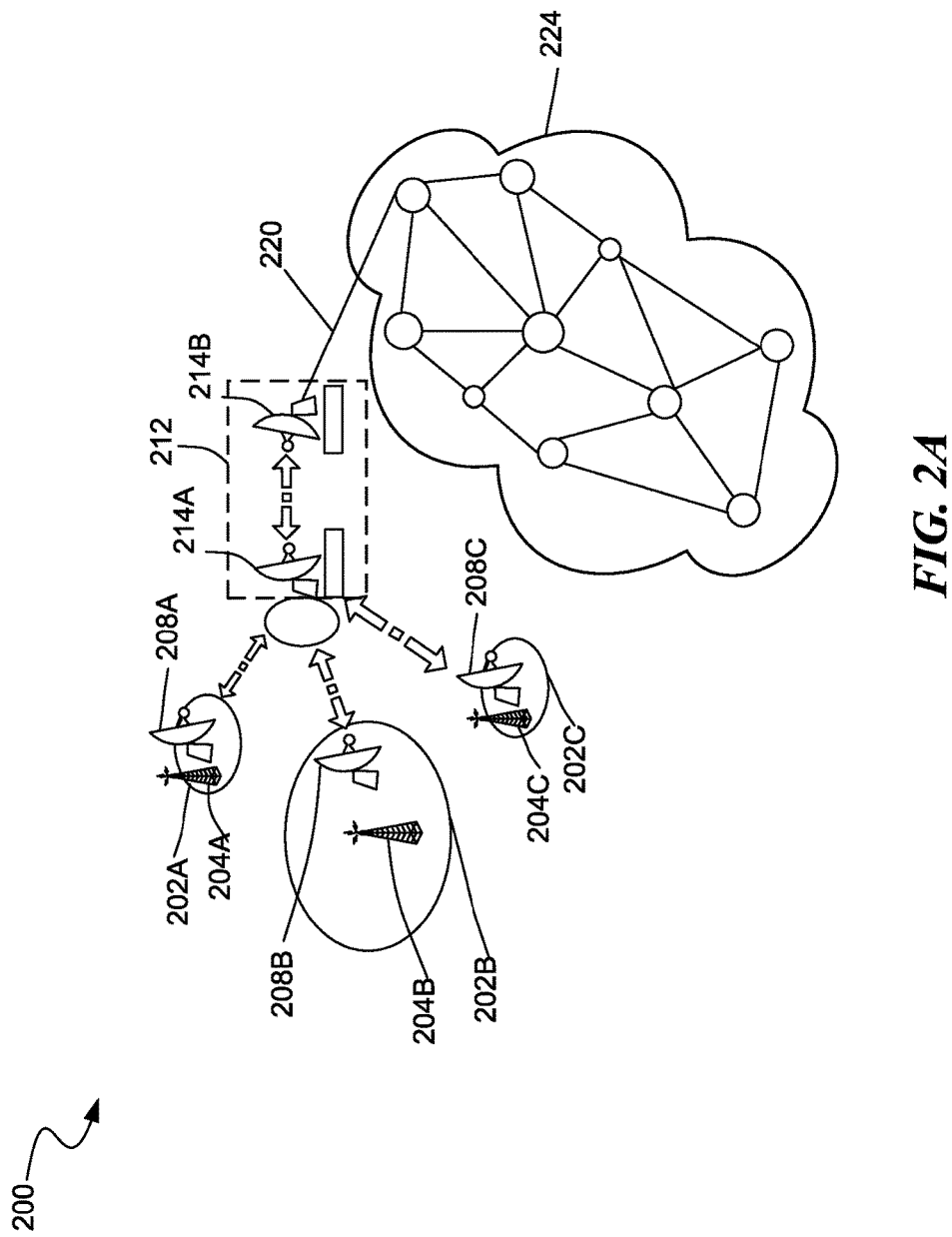
FIG. 2A is a block diagram illustrating an example of a microwave-based rural area network, in accordance with various embodiments.

FIG. 2A is a block diagram illustrating an example of a microwave-based rural area network 200, in accordance with various embodiments. The microwave-based rural area network 200 includes one or more local area networks (e.g., a local area network 202A, a local area network 202B, and a local area network 202C, collectively as the "local area networks 202"). The local area networks 202 can be established by access points (e.g., an access point 204A, an access point 204B, and an access point 204C, collectively as the "access points 204"). Each of the access points 204 can establish a wireless network (e.g., via Wi-Fi or cellular network service). In some embodiments, at least some of the access points 204 enable wired network access as well.

Each of the access points 204 can be connected to a backhaul network connector (e.g., a microwave dish). For example, the access points 204 are respectively connected to a microwave dish 208A, a microwave dish 208B, and a microwave dish 208C (collectively as the "microwave dishes 208"). Each of the microwave dishes 208 can be directed at a microwave backhaul system 212. For example, the microwave backhaul system 212 can include a subscriber side communication system 214A. The subscriber side communication system 214A can receive data represented by microwave signals from one or more of the microwave dishes 208 and forward that data as microwave signals to a gateway side communication system 214B. The gateway side communication system 214B can transmit data as microwave signals to the subscriber side communication system 214A and the subscriber side communication system 214A can forward that data as microwave signals to at least one of the microwave dishes 208. The gateway side communication system 214B may be coupled to a wide area network 224 via a wired connection 220. For example, the wired connection 220 can be an optical fiber.

Figure 2B:
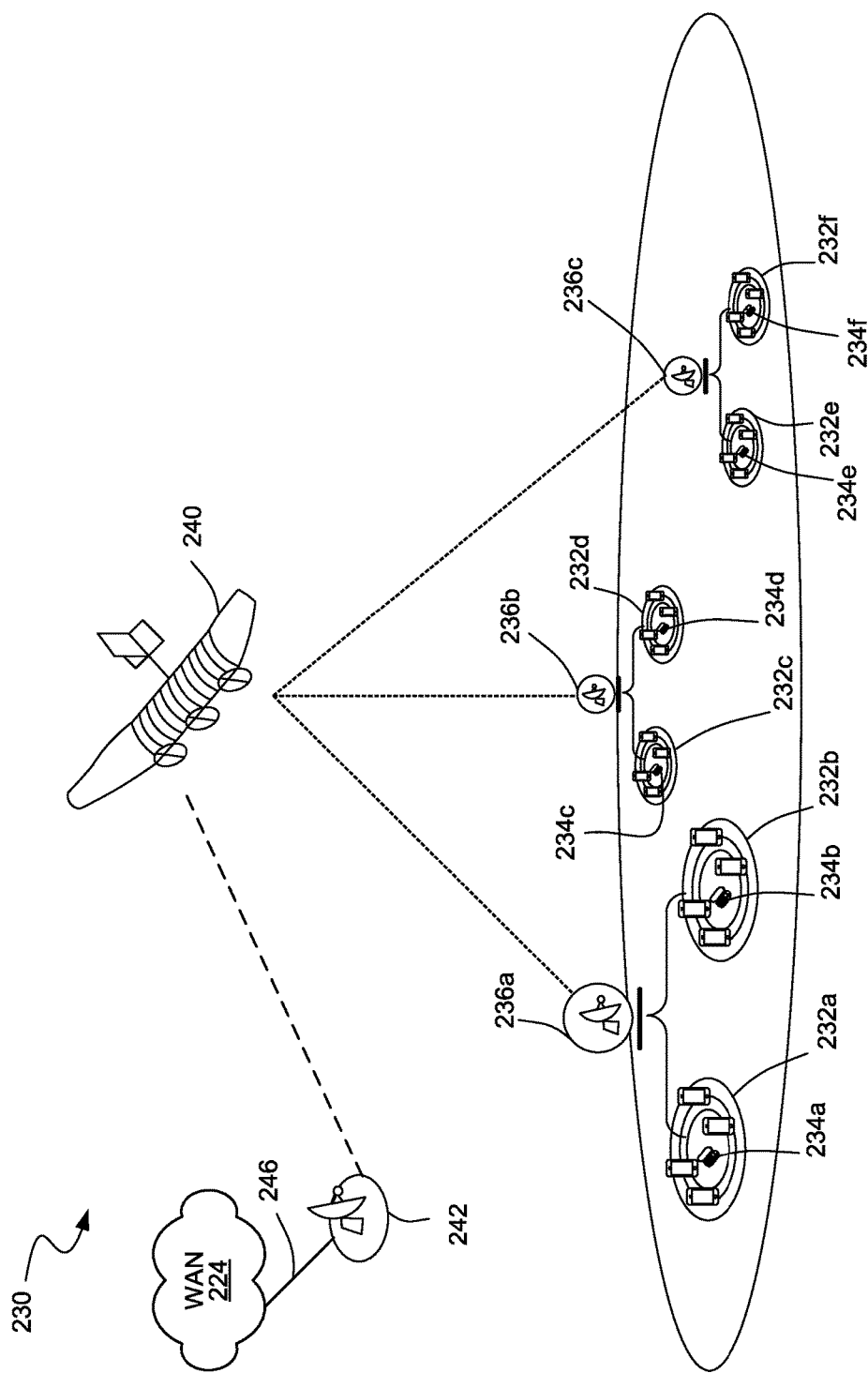
FIG. 2B is a block diagram illustrating an example of a drone-based rural area network, in accordance with various embodiments.

FIG. 2B is a block diagram illustrating an example of a drone-based rural area network 230, in accordance with various embodiments. The drone-based rural area network 230 includes one or more local area networks (e.g., a local area network 232A, a local area network 232B, a local area network 232C, a local area network 232D, a local area network 232E, and a local area network 232F, collectively as the "local area networks 232"). The local area networks 232 can be established by access points (e.g., an access point 234A, an access point 234B, an access point 234C, an access point 234D, an access point 234E, and an access point 234F, collectively as the "access points 234"). Each of the access points 234 can establish a wireless network via Wi-Fi or cellular network service. In some embodiments, at least some of the access points 234 enable wired network access as well.

Each of the access points 234 can be connected to an antenna. In one example, the access points 234 are connected to an antenna 236A, an antenna 236B, and an antenna 236C (collectively as the "antennae 236"). Some of the access points 234 can share the same antenna. Each of the antennae 236 can be directed at a drone-based backhaul system 240. For example, the drone-based backhaul system 240 can receive data from a drone communication system 242 and transmit the data to the antennae 236. For example, the drone-based backhaul system 240 can receive data from the antennae 236 and transmit the data to the drone communication system 242. The drone communication system 242 may be coupled to a wide area network (e.g., the wide area network 224) via a wired connection 246.

Figure 2C:
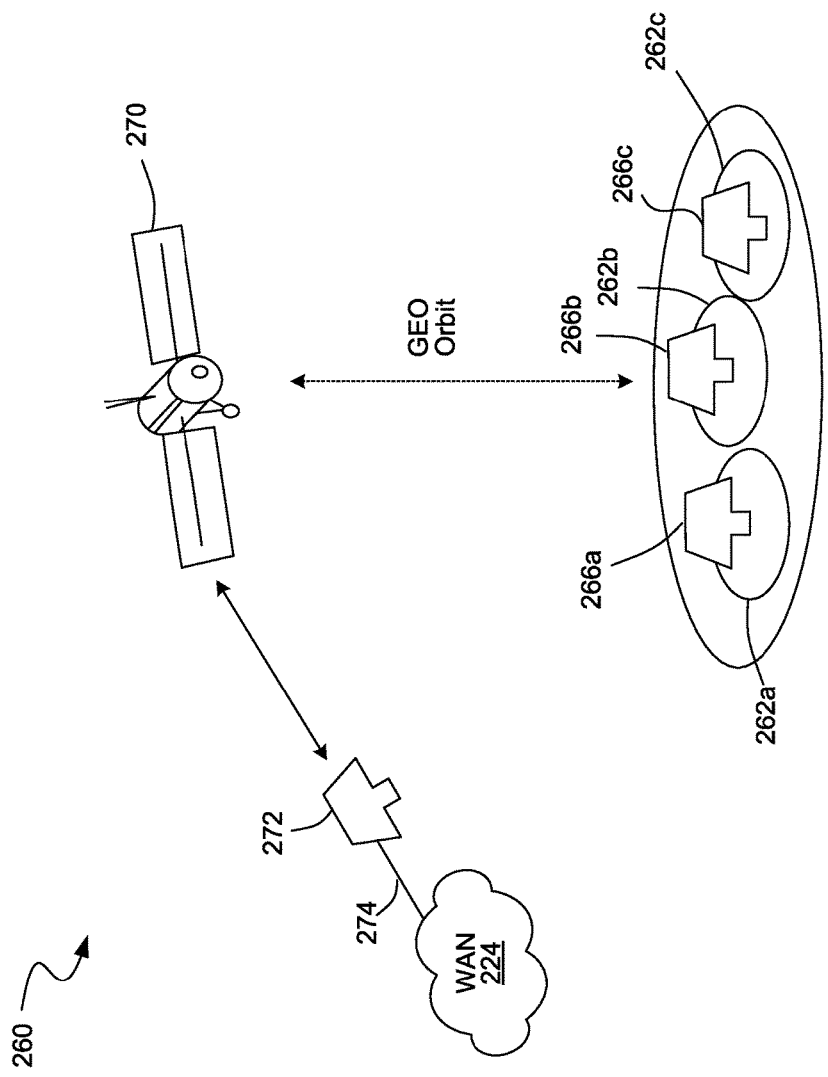
FIG. 2C is a block diagram illustrating an example of a satellite-based rural area network, in accordance with various embodiments.

FIG. 2C is a block diagram illustrating an example of a satellite-based rural area network 260, in accordance with various embodiments. The satellite-based rural area network 260 includes one or more local area networks (e.g., a local area network 262A, a local area network 262B, and a local area network 262C, collectively as the "local area networks 262"). The local area networks 262 can be established by access points (e.g., a satellite network equipment 266A, a satellite network equipment 266B, and a satellite network equipment 266C, collectively as the "satellite network equipment 266"). Each of the satellite network equipment 266 can establish a wireless network (e.g., via Wi-Fi or cellular network service). In some embodiments, at least some of the satellite network equipment 266 can enable wired network access as well.

The satellite network equipment 266 can communicate with a satellite-based backhaul system 270. For example, the satellite-based backhaul system 270 can receive data from the satellite network equipment 266 and transmit the data to a satellite communication system 272. For example, the satellite-based backhaul system 270 can receive data from the satellite communication system 272 and transmit the data to the satellite network equipment 266. The satellite communication system 272 may be coupled to a wide area network (e.g., the wide area network 224) via a wired connection 274.

Figure 3:
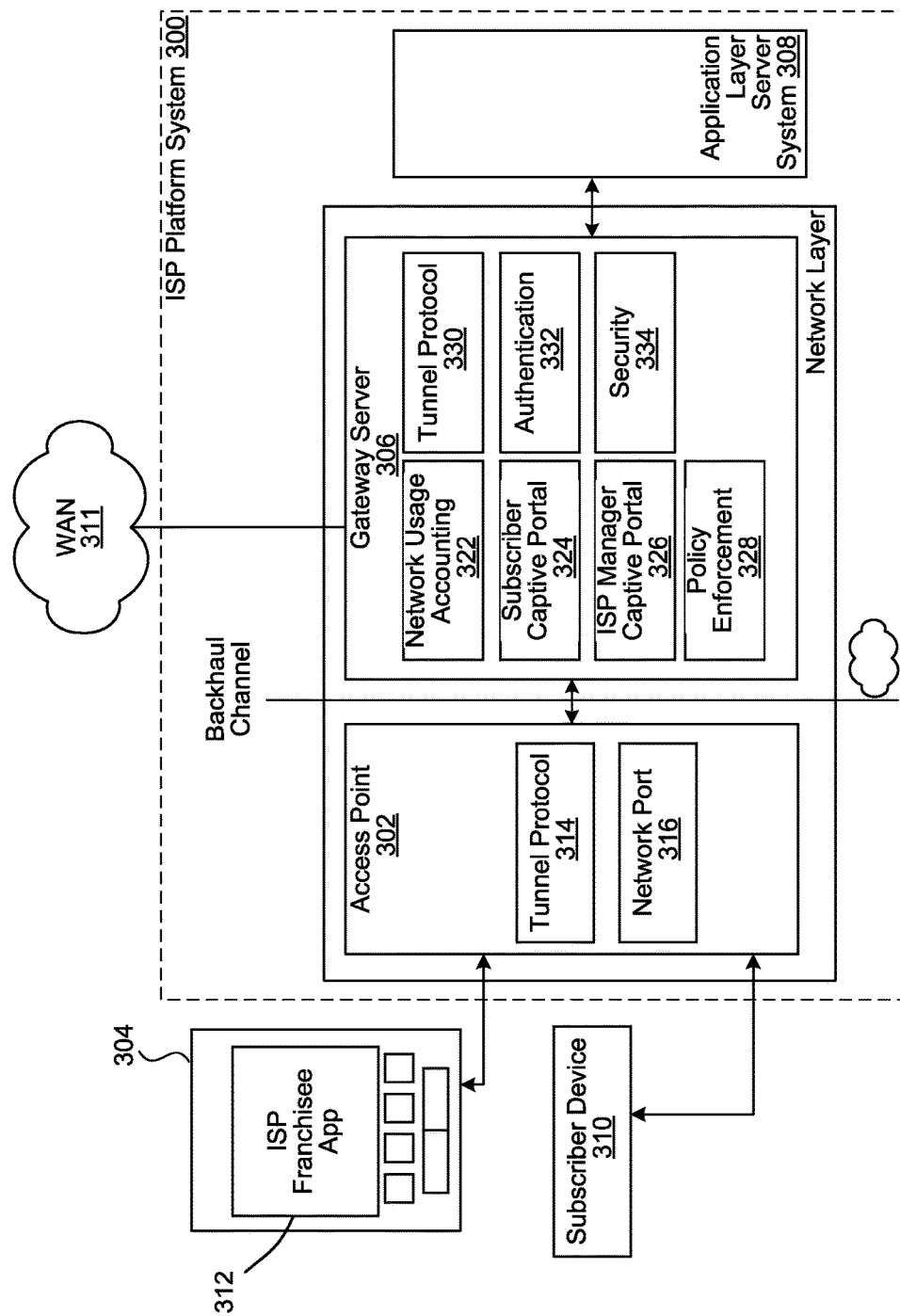
FIG. 3 is a functional block diagram illustrating a network layer of an ISP platform system, in accordance with various embodiments

FIG. 3 is a functional block diagram illustrating a network layer of an ISP platform system 300, in accordance with various embodiments. The functional components (e.g., engines, modules, and/or databases) of the ISP platform system 300 can run in an access point 302, an ISP franchisee device 304, a gateway server 306, an application layer server system 308 (e.g., the web tier server system 120 of FIG. 1 and the database tier server system 124 of FIG. 1), and/or a subscriber device 310. The application layer server system 308 and a WAN 311 (e.g., the Internet) can be coupled to the gateway server 306. The locations of the functional components and modules are part of examples and can be relocated to one or more other devices of the ISP platform system 300.

For example, the ISP franchisee device 304 can include an ISP franchisee application 312. In some embodiments, the ISP franchisee application 312 can be a web-based application hosted by the access point 302, the gateway server 306, or the application layer server system 308. In these embodiments, an ISP franchisee account can access the ISP franchisee application 312 through a web browser of the ISP franchisee device 304. The ISP franchisee application 312 can enable the ISP franchisee device 304 to access ISP management features of the ISP platform system 300.

The access point 302 can include a tunnel protocol engine 314 and a network port engine 316. The network port engine 316 can host a LAN for one or more devices (e.g., the ISP franchisee device 304, the subscriber device 310, and/or the end-user devices 106 of FIG. 1). The network port engine 316 can provide other network services to connect the devices (e.g., the subscriber device 310 and the ISP franchisee device 304) to external services and devices. In some embodiments, the network port engine 316 can provide voice over Internet protocol (VoIP) and Internet protocol television (IPTV) for the subscriber device 310.

The tunnel protocol engine 314 establishes a network tunnel (e.g., a secure tunnel) from the access point 302 to the gateway server 306. This can enable the ISP franchisee device 304 to access the ISP management features implemented by the application layer server system 308. This can also enable the devices connected to the LAN to access the WAN 311 and other application services available via the gateway server 306.

The gateway server 306 can include a network usage accounting engine 322, a subscriber captive portal 324, an ISP manager captive portal 326, a policy enforcement engine 328, a tunnel protocol engine 330, an authentication engine 332, a security engine 334, or any combination thereof. The authentication engine 332 is configured to authenticate a device requesting network access through the gateway server 306. For example, the authentication engine 332 can utilize an authorization portal to facilitate authentication of the requesting device. The authentication engine 332 can also authorize access based on a hardware identifier or attribute (e.g., a MAC address) of the requesting device. Prior to authentication, the gateway server 306 can prevent network access.

The authentication engine 332 can include an authentication portal. The authentication portal can receive authentication parameters from the requesting device (e.g., the subscriber device 310 or the ISP franchisee device 304). For example, the authentication parameters can include a login identifier and a password. In some embodiments, the login identifier is a user name. In some embodiments, the login identifier is a hardware identifier (e.g., a phone number in a SIM card, a MAC address, or a unique device ID). In some embodiments, the authentication engine 332 can store a list of hardware identifiers that are pre-authorized. When the authentication engine 332 detects that a requesting device matches one of the listed hardware identifiers, the authentication engine 332 can automatically grant access without requesting a password. Based on the authentication parameters, the authentication engine 332 can determine whether the requesting device is a subscriber device or an ISP franchisee device.

In several embodiments, when the requesting device is a subscriber device, the authentication engine 332 can cause the subscriber captive portal 324 to be presented to the requesting device. In some embodiments, the authentication engine 332 can generate the subscriber captive portal 324 as a webpage and present the webpage to the requesting device. In some embodiments, the authentication engine 332 can trigger the requesting device to open a native application corresponding to the subscriber captive portal 324. The subscriber captive portal 324 can provide links or interactive elements to grant access to the WAN 311 and a number of application services (e.g., provided by a subscriber service engine 422 of FIG. 4) via the application layer server system 308.

In several embodiments, when the requesting device is the ISP franchisee device 304, the authentication engine 332 cause the ISP manager captive portal 326 to be presented to the requesting device. In some embodiments, the authentication engine 332 can generate the ISP manager captive portal 326 as a webpage and present the webpage to the requesting device. In some embodiments, the authentication engine 332 can trigger the requesting device to open a native application corresponding to the ISP manager captive portal 326. The ISP manager captive portal 326 enables the ISP franchisee device 304 to access a number of application services (e.g., provided by an ISP franchisee service engine 424 of FIG. 4) to manage network usage policies associated with subscriber accounts. In some embodiments, the ISP manager captive portal 326 also includes links or interactive elements to access a subset or all of the application services and accessibility provided in the subscriber captive portal 324.

The network usage accounting engine 322 can track network usage through the network tunnel between the gateway server 306 and the access point 302. For example, the network usage accounting engine 322 can measure how much network traffic (e.g., measured as number of bits transferred) is attributed to the subscriber device 310, direction of network traffic (e.g., upload or download), data types of network traffic (e.g., VoIP, IPTV, application services or general Internet access), temporal distribution (e.g., daytime or nighttime) of when such network traffic occurred, or any combination thereof. The network usage accounting data can be stored in the gateway server 306.

The policy enforcement engine 328 can enforce one or more network usage policies based on the network usage accounting data. For example, the policy enforcement engine 328 can block network traffic, enable network traffic, restrict bandwidth, interrupt or intercept access, or any combination thereof. Policy enforcement can be in response to detecting one or more trigger conditions during live monitoring of network usage by the subscriber device 310 (e.g., relative to a data plan associated with the subscriber device 310 and its subscriber account). In some embodiments, the policy enforcement engine 328 enforces the network usage policies in real-time based on the network usage accounting data and application services usage data. In some embodiments, the policy enforcement engine 328 enforces the network usage policies by denoting a policy violation or a charge amount to a subscriber account, whenever a network usage policy is violated by the subscriber account. This enables an ISP franchisee account to later communicate with a subscriber user associated with the subscriber account to remedy the policy violation or the charge amount.

The tunnel protocol engine 330 can correspond with the tunnel protocol engine 314. Together, the tunnel protocol engines can establish a secure network tunnel that incorporates and/or connects the local area network established by the access point 302 with the networks (e.g., an application services network and the Internet) connected to the gateway server 306.

The security engine 334 is configured to ensure communication passing through the gateway server 306 is secured. For example, the security engine 334 can make sure data passing to or from the gateway server 306 is encrypted according to a security protocol (e.g., transport layer security (TLS) protocol). The application layer server system 308 can provide application services for the subscriber device 310 and/or the ISP franchisee device 304. Examples of the functional components of the application layer server system 308 are further illustrated in FIG. 4.

Figure 4:
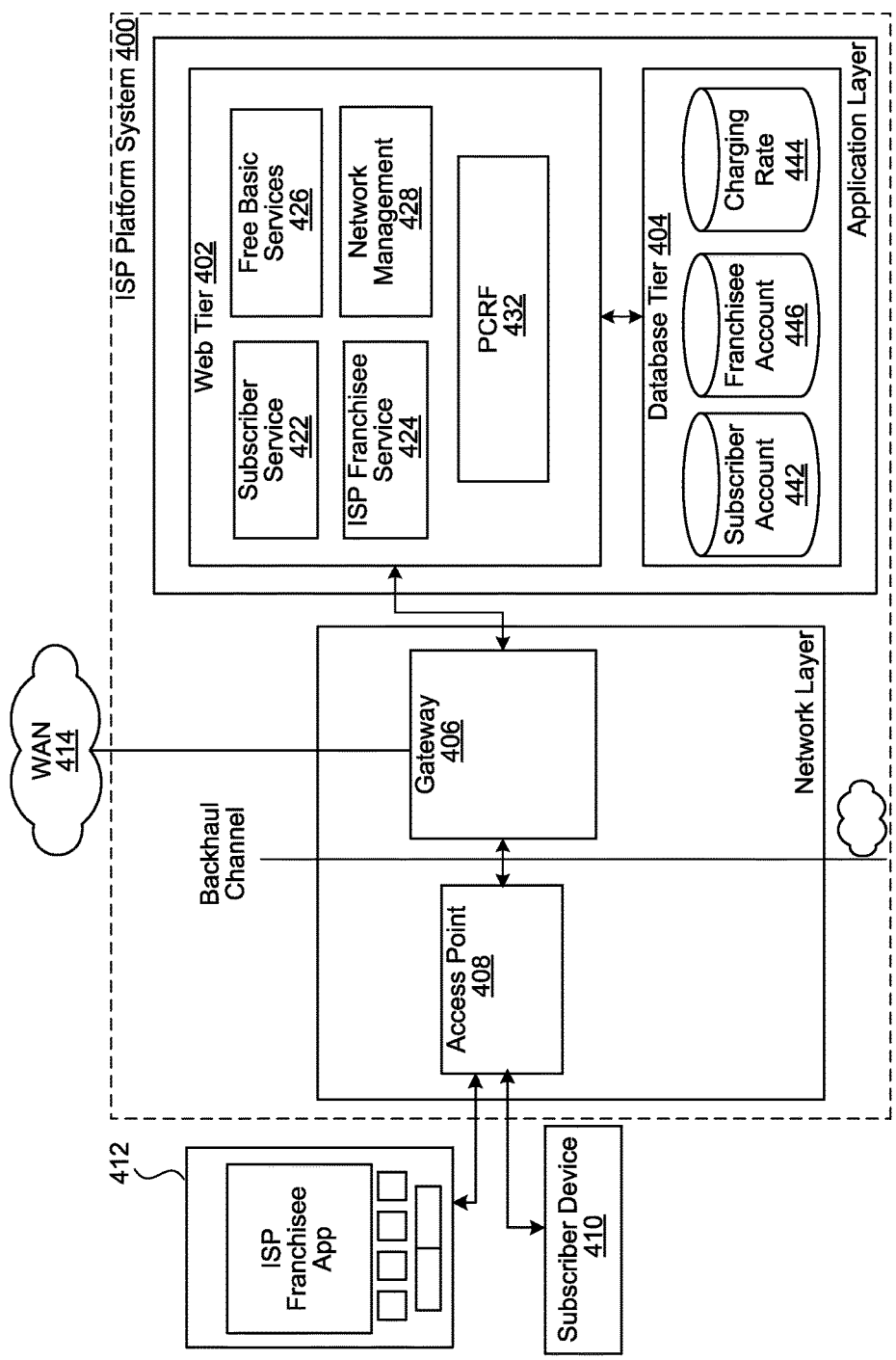
FIG. 4 is a functional block diagram illustrating an example application layer of an ISP platform system, in accordance with various embodiments.

FIG. 4 is a functional block diagram illustrating an example application layer of an ISP platform system 400, in accordance with various embodiments. The ISP platform system 400 can be the ISP platform system 300 of FIG. 3. In the illustrated example, the functional components representing application services are implemented in a web tier system 402 and a database tier system 404. The web tier system 402 and the database tier system 404 can be part of the application layer server system 308 of FIG. 3. The web tier system 402 can be coupled to a gateway server 406 (e.g., the gateway server 306 of FIG. 3). The database tier system 404 can be coupled to the web tier system 402. The database tier system 404 can be coupled to the web tier system 402 to provide database access for specific application services. For example, the database tier system 404 can include a subscriber account database 442, a charging rate database 444, a franchisee account database 446, or any combination thereof.

In some embodiments, at least some of the functional components described for the web tier system 402 and/or the database tier system 404 can be implemented in an access point 408 (e.g., the access point 302 of FIG. 3) or the gateway server 406. In the illustrated example, a subscriber device 410 (e.g., the subscriber device 310 of FIG. 3) associated with a subscriber account and an ISP franchisee device 412 (e.g., the ISP franchisee device 304 of FIG. 3) associated with an ISP franchisee account are connected in a LAN hosted by the access point 408. The gateway server 406 can be connected to a WAN 414 (e.g., the WAN 311 of FIG. 3).

The web tier system 402 can provide applications services for the subscriber device 410 via a subscriber service engine 422 and application services for the ISP franchisee device 412 via an ISP franchisee service engine 424. The web tier system 402 can also provide free basic services via a free basic services engine 426. The web tier system 402 can provide a network management service via a network management engine 428.

Figure 6A:
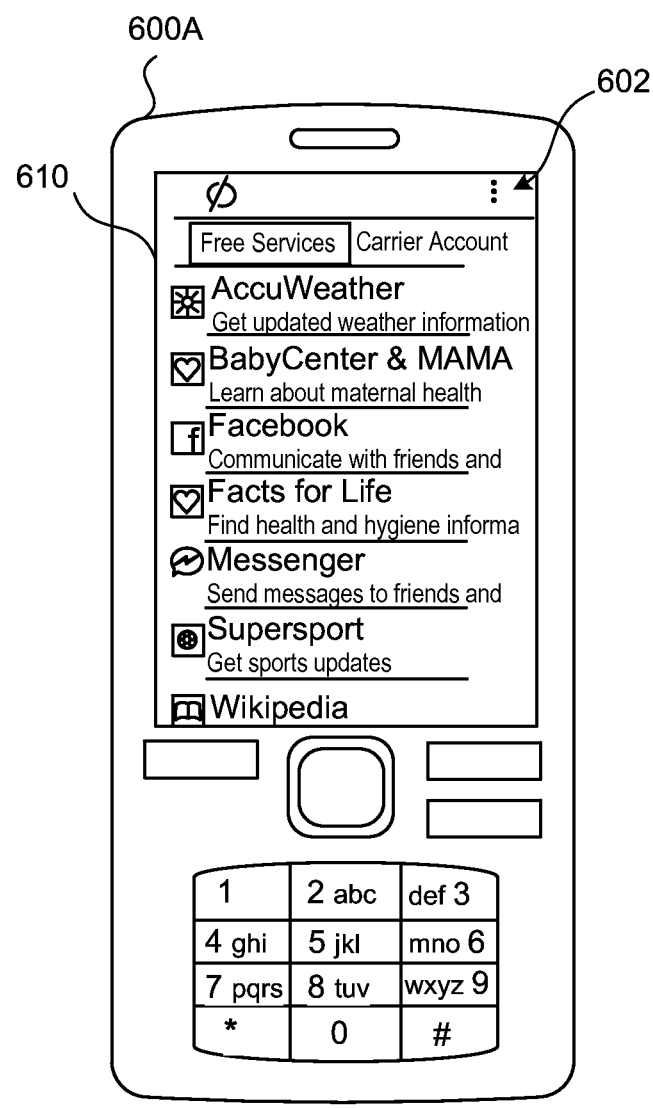
FIG. 6A is an example screenshot illustrating an application services panel of an ISP consumer interface implemented on a mobile device, in accordance with various embodiments.
Figure 6B:
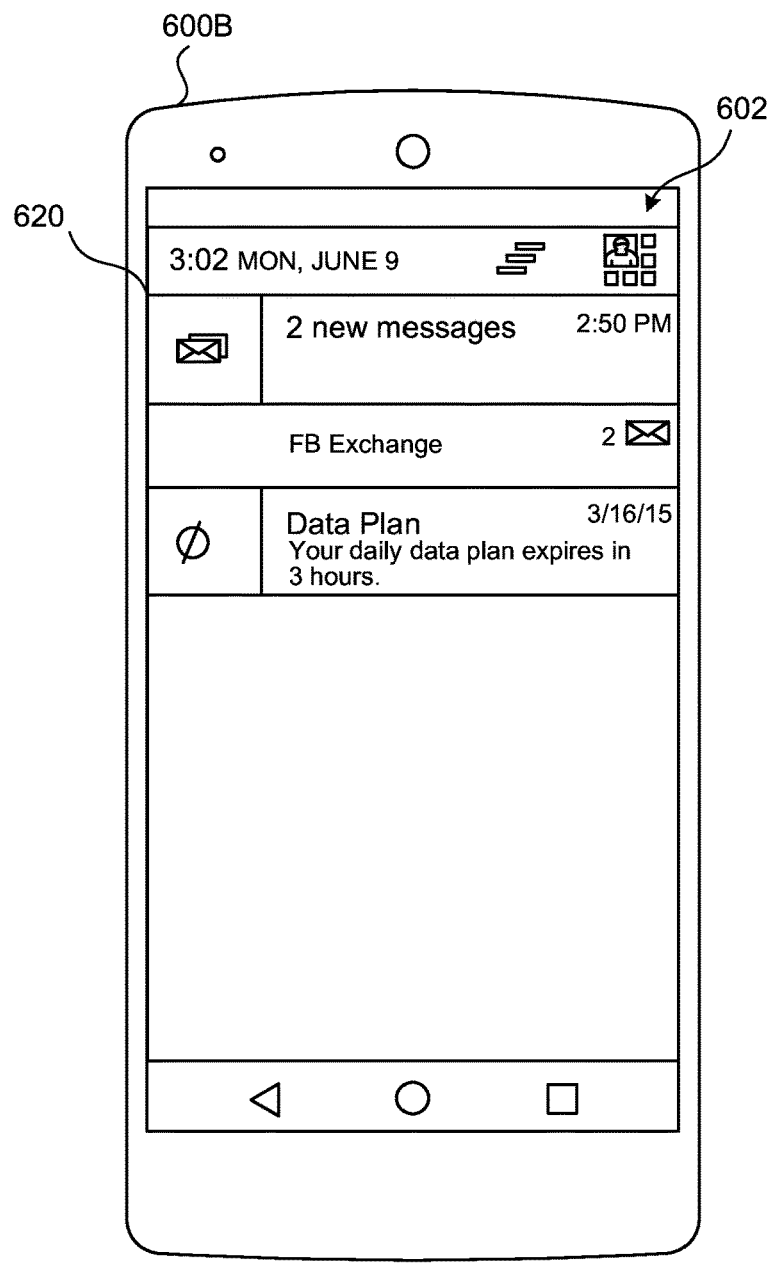
FIG. 6B is an example screenshot illustrating a message portal panel of an ISP consumer interface implemented on a mobile device, in accordance with various embodiments.
Figure 6C:
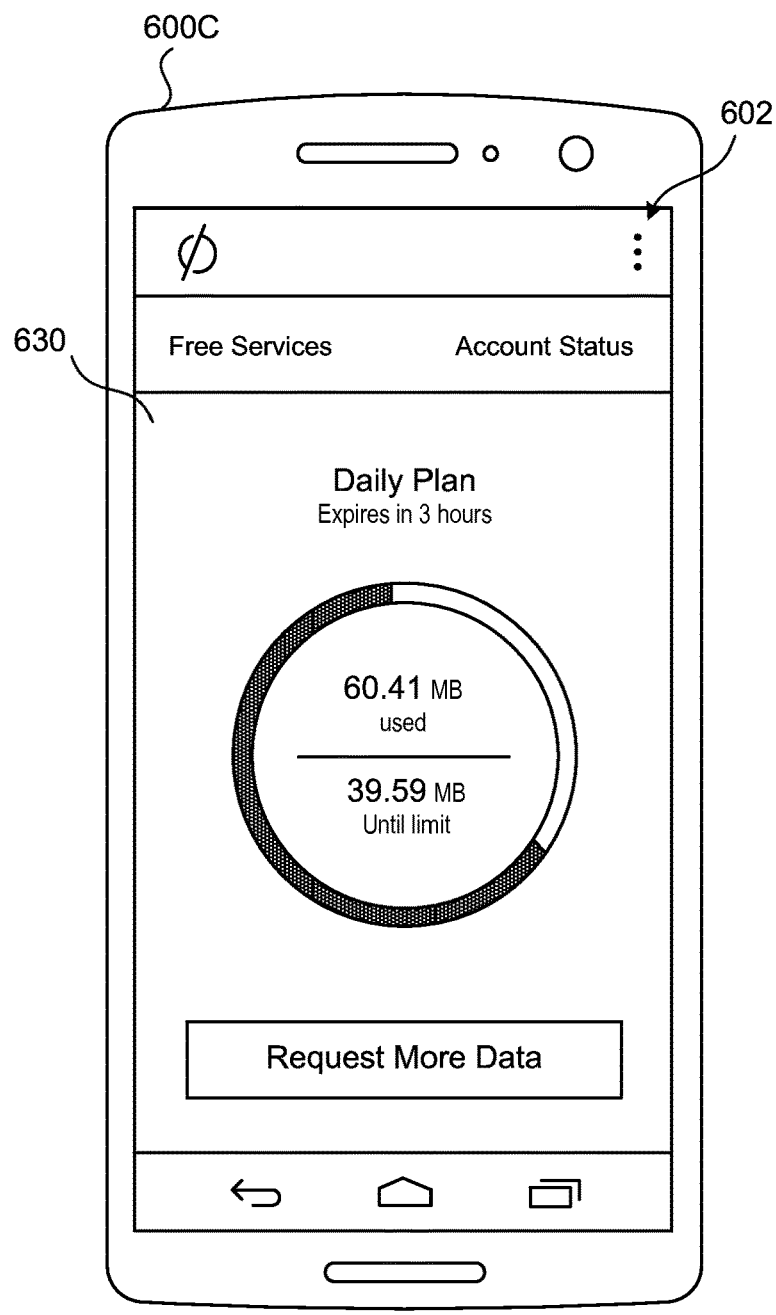
FIG. 6C is an example screenshot illustrating a subscriber account panel of an ISP consumer interface implemented on a mobile device, in accordance with various embodiments.

The subscriber service engine 422 enables a subscriber account to access and edit its account information. The subscriber captive portal 324 can provide links and/or interactive elements to engage with the subscriber service engine 422. For example, the subscriber service engine 422 enables the subscriber account to request a modification to its one or more data plans (e.g., network access subscriptions) or view the status of the data plans. In some embodiments, the subscriber service engine 422 can show one or more subscriber devices associated with the subscriber account and one or more access points used by the subscriber account. For example, FIGS. 6A-6C provide examples of an ISP subscriber interface provided by the subscriber service engine 422. The subscriber service engine 422 can save the modified subscriber account information to the subscriber account database 442.

The ISP franchisee service engine 424 enables an ISP franchisee account to manage one or more network equipment (e.g., the access point 408) and one or more subscriber accounts that use those network equipment. The ISP manager captive portal 326 can provide links and/or interactive elements to engage with the ISP franchisee service engine 424. For example, the ISP franchisee service engine 424 enables the ISP franchisee account to modify data plans of subscriber accounts. In some embodiments, the ISP franchisee service engine 424 can enable monitoring of one or more access points associated with the ISP franchisee account. The ISP manager captive portal 326 of FIG. 3 can provide links and/or interactive elements to engage with the ISP franchisee service engine 424. For example, FIGS. 5A-5E provide examples of an ISP management interface provided by the ISP franchisee service engine 424. The ISP franchisee service engine 424 can save the modified franchisee account information to the franchisee account database 446 and the modified subscriber account information to the subscriber account database 442.

In some embodiments, the free basic services engine 426 provides application services that do not require a paid subscription. For example, the free basic services engine 426 can provide weather services, news services, entertainment services, search engine services, encyclopedia services, location-based services, social networking services, or any combination thereof. In some embodiments, the free basic services engine 426 can enable the subscriber account to access a social network. In some embodiments, the subscriber account is associated with a social network account.

In some embodiments, the web tier system 402 can include a policy and charging rules function (PCRF) engine 432. The PCRF engine 432 can determine, in real-time, charging policies and rules associated with using the application services. The PCRF engine 432 can operate concurrently with the application services and access the subscriber account database 442. This enables, for example, the web tier system 402 keep an accounting of charges associated with the usage of application services (e.g., by a subscriber account). The accounting of the charges can be stored in the subscriber account database 442 and/or the charging rate database 444. The logics and rules associated with rates for charging the subscriber account can be stored in the charging rate database 444. After viewing the charges associated with the subscriber account in the ISP management interface, an ISP franchisee account can charge the subscriber account automatically or manually.

In some embodiments, the web tier system 402 can include the network management engine 428 is configured to monitor the health (e.g., presence of hardware failure, logic fault, or behavior irregularity) of network devices and services (e.g., the gateway server 406, application services connected to the gateway server 406, the access point 408, the network tunnel, or any combination thereof). The network management engine 428 can be configured to ensure the integrity of these network devices and services. The network management engine 428 can be configured to provide an interface to remotely control the network devices and services. In several embodiments, the network management service provided by the network management engine 428 is only accessible to an authenticated ISP franchisee account.

Portions of functional components (e.g., engines, modules, portals and databases) associated with the rural networking system 100 of FIG. 1, the ISP platform system 300 of FIG. 3, and the ISP platform system 400 of FIG. 4, may each be implemented in the form of software modules, special-purpose circuitry, one or more appropriately programmed programmable processors, a single board chip, a field programmable gate array, a network capable computing device, a virtual machine, a cloud-based terminal, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not transitory signal. Memory space and storages described in the figures can be implemented with the tangible storage memory as well, including volatile or non-volatile memory.

Each of the functional components may operate individually and independently of other components. Some or all of the components may be executed on the same host device or on separate devices. The separate devices can be coupled together through one or more communication channels (e.g., wireless or wired channel) to coordinate their operations. Some or all of the components may be combined as one component. A single component may be divided into sub-components, each sub-component performing separate method step or method steps of the single component. A functional component implemented on a first device can be moved to a second device when appropriate.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified from one component to be accessed in another component. In some embodiments, at least some of the components can be upgraded or modified remotely (e.g., by reconfiguring executable instructions that implements a portion of the components).

Figure 5A:
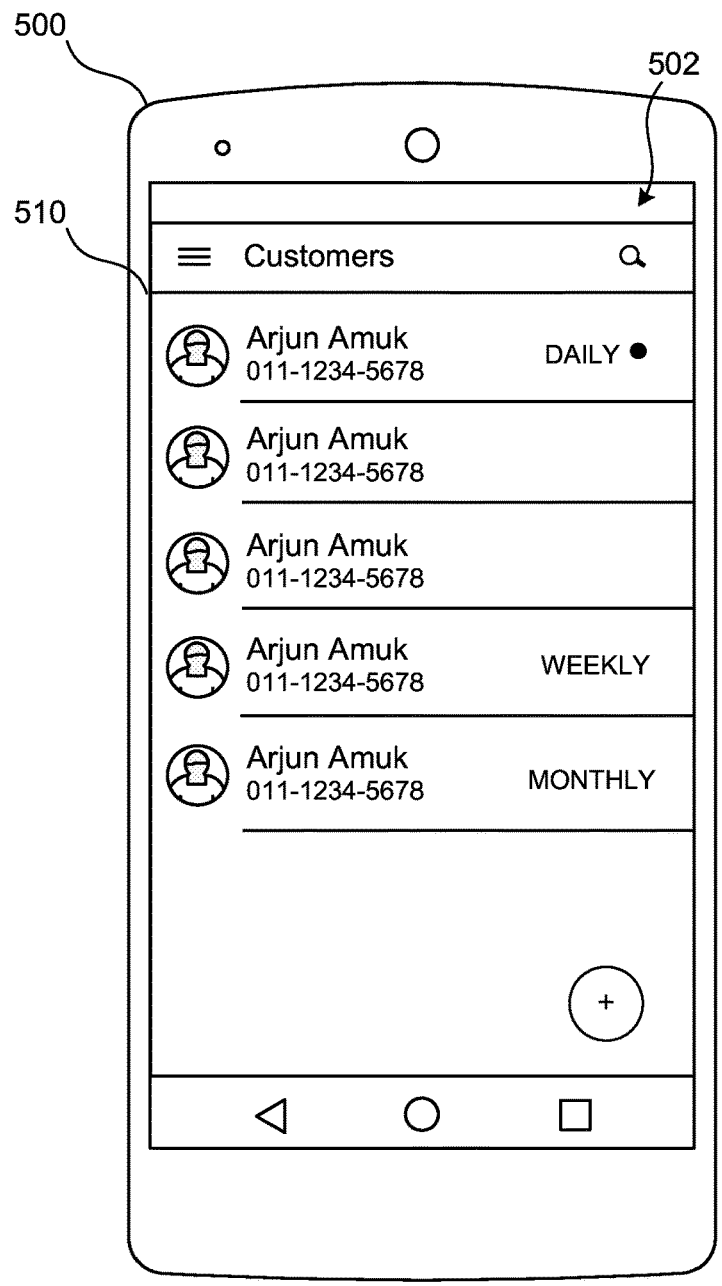
FIG. 5A is an example screenshot illustrating a subscriber list panel of an ISP management interface implemented on a mobile device, in accordance with various embodiments.

FIG. 5A is an example screenshot illustrating a subscriber list panel 510 of an ISP management interface 502 implemented on a mobile device 500, in accordance with various embodiments. The ISP management interface 502 can be generated specifically for an ISP franchisee account in an ISP platform system. For example, the subscriber list panel 510 can display a list of subscriber accounts that the ISP franchisee account is responsible for. In some embodiments, when a subscriber account registers with a gateway server in the ISP platform system, the ISP platform system keep track of a set of authentication parameters associated with the subscriber account. When the subscriber account receives a data plan from the ISP franchisee account, the subscriber account can be added to the list of subscriber accounts associated with the ISP franchisee account. In some embodiments, the ISP management interface 502 can rank the subscriber account within the list according to the subscriber account's recent network usage, estimated data plan expiration time, frequency of network usage, credit history, payment(s) made, or any combination thereof.

Figure 5B:
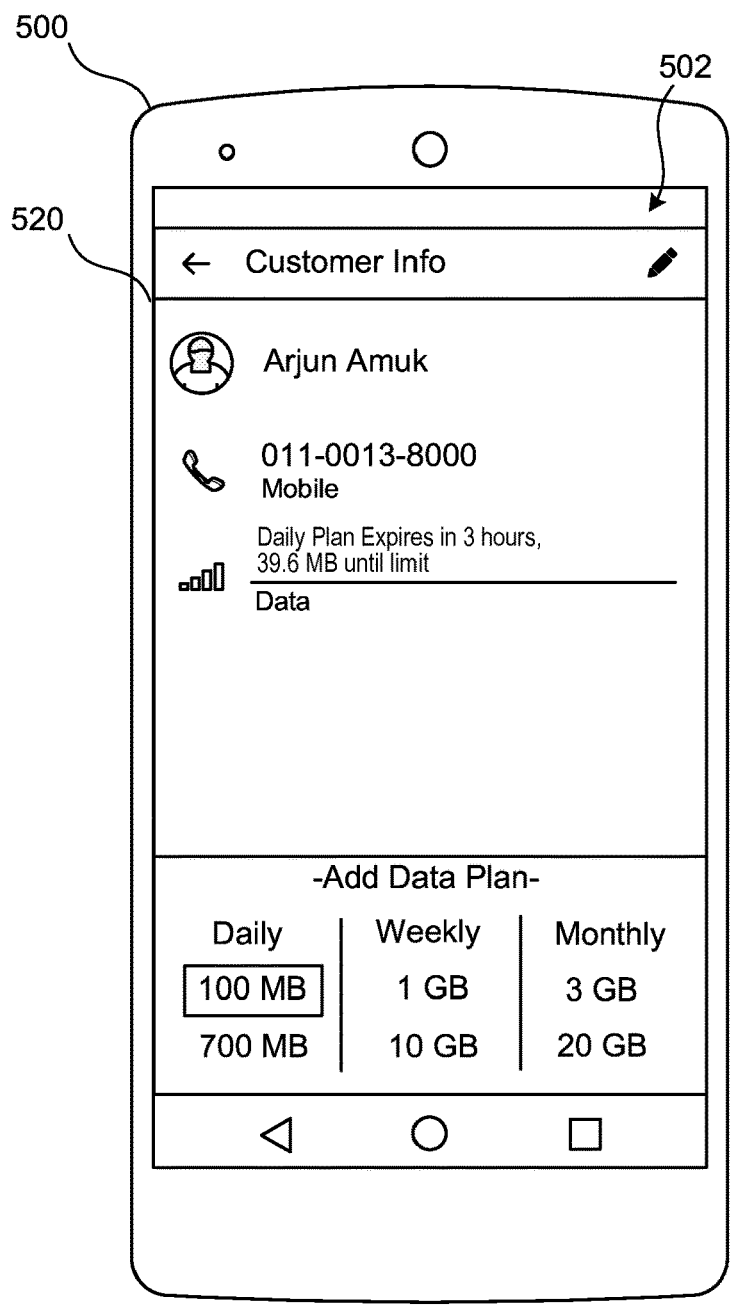
FIG. 5B is an example screenshot illustrating a subscriber management panel of the ISP management interface implemented on the mobile device, in accordance with various embodiments.

FIG. 5B is an example screenshot illustrating a subscriber management panel 520 of the ISP management interface 502 implemented on the mobile device 500, in accordance with various embodiments. The ISP management interface 502 can transition to the subscriber management panel 520 when a user selection of a particular subscriber is detected on the subscriber list panel 510. The subscriber management panel 520 displays information associated with the selected subscriber. For example, the subscriber management panel 520 can display the subscriber's name, the subscriber's phone number, network usage accounting information associated with the subscriber, data plan associated with the subscriber, or any combination thereof.

In several embodiments, the subscriber management panel 520 can also present interactive elements (e.g., buttons, drop-down list, dials, etc.) to "top up," modify, add, and/or remove the data plan of the subscriber. In the illustrated example, the subscriber management panel 520 displays interactive elements to add a daily data plan (e.g., 100 MB or 700 MB), a weekly data plan (e.g., 1 GB or 10 GB), or a monthly data plan (e.g., 3 GB or 20 GB).

Figure 5C:
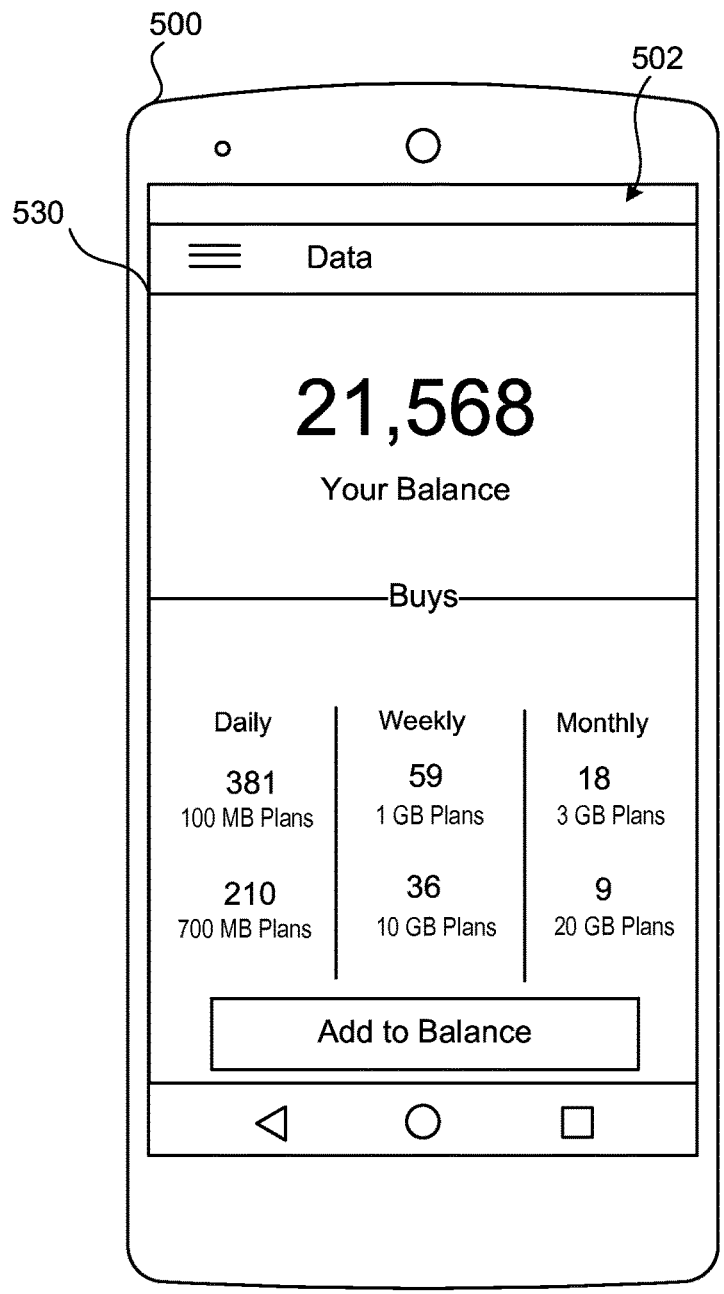
FIG. 5C is an example screenshot illustrating an account balance management panel of the ISP management interface implemented on the mobile device, in accordance with various embodiments.

FIG. 5C is an example screenshot illustrating an account balance management panel 530 of the ISP management interface 502 implemented on the mobile device 500, in accordance with various embodiments. The account balance management panel 530 displays information associated with an ISP franchisee account. The ISP franchisee account can be established by a local entrepreneur in a rural region that participates locally to an ISP platform system (e.g., the ISP platform system 300 of FIG. 3 and/or the ISP platform system 400 of FIG. 4). As such, the ISP platform system can assign a measurable quantity of data plans for the ISP franchisee account to resell. The account balance management panel 530 provides information associated with this measurable quantity of data plans. For example, the account balance management panel 530 can include a balance accounting of credit or debit owed to the ISP platform system. The account balance management panel 530 can also include information regarding how many data plans of each type has been resold or is ready to be resold by the ISP franchisee account. The account balance management panel 530 can include interactive elements to add to the balance of credit or debit.

Figure 5D:
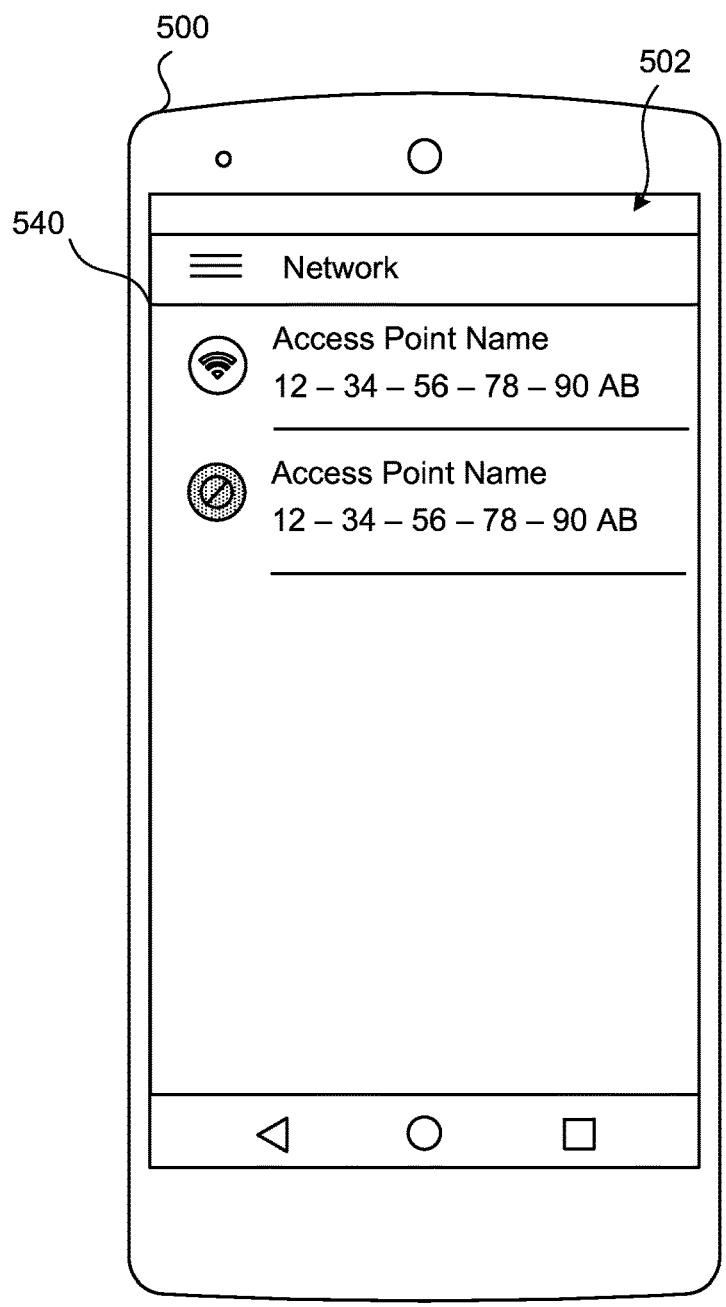
FIG. 5D is an example screenshot illustrating a network monitor panel of the ISP management interface implemented on the mobile device, in accordance with various embodiments.

FIG. 5D is an example screenshot illustrating a network monitor panel 540 of the ISP management interface 502 implemented on the mobile device 500, in accordance with various embodiments. One or more access points can be associated with an ISP franchisee account. The network monitor panel 540 enables the ISP franchisee account to monitor the statuses of the access points. For example, the network monitor panel 540 can identify the access points by their MAC addresses or by assigned labels made by the ISP franchisee account. For example, the network monitor panel 540 can provide interactive elements for the ISP franchisee account to create a label for an access point. In some embodiments, the network monitor panel 540 can provide interactive elements for the ISP franchisee account to turn on and off an access point. In some embodiments, the network monitor panel 540 can provide interactive elements for the ISP franchisee account to block network traffic to and from an access point. In some embodiments, the network monitor panel 540 can provide statistics and information related to the health state or network traffic history of the access points, including for example, network bandwidth, upload speed, download speed, device temperature, spam detection result, network-based attack detection result, or any combination thereof.

Figure 5E:
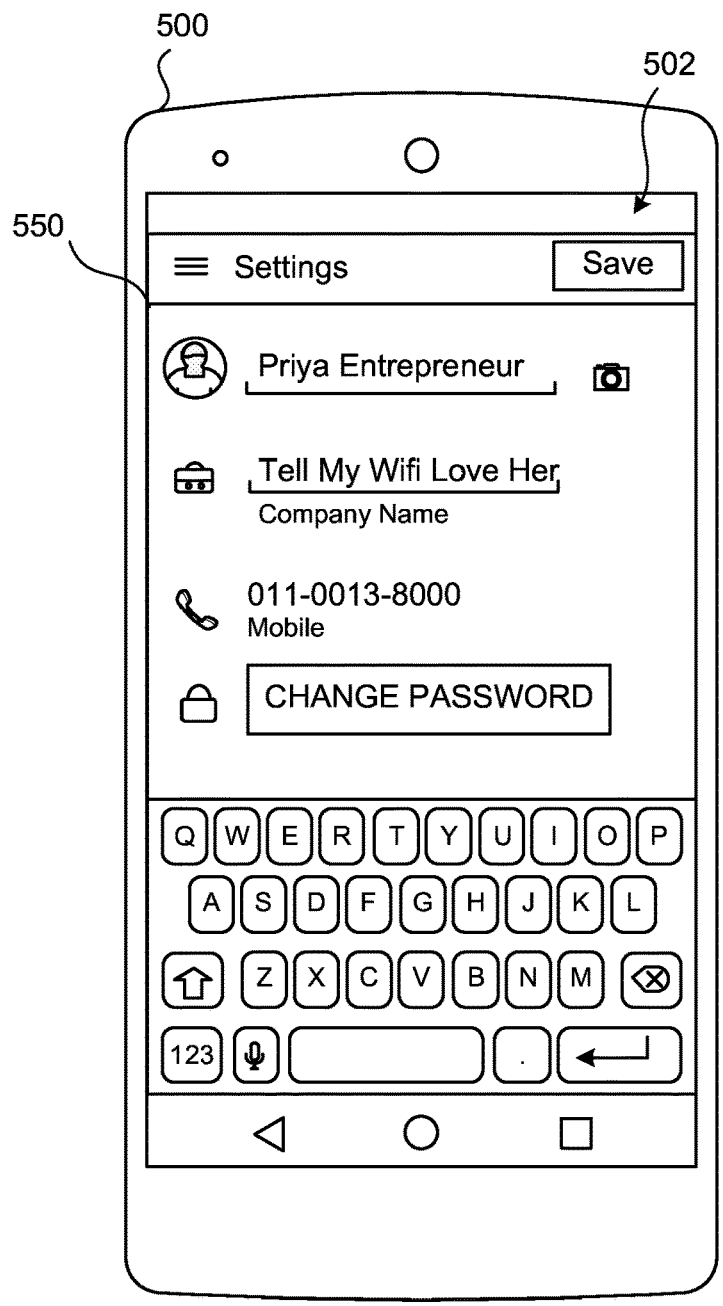
FIG. 5E is an example screenshot illustrating an ISP setting panel of the ISP management interface implemented on the mobile device, in accordance with various embodiments.

FIG. 5E is an example screenshot illustrating an ISP setting panel 550 of the ISP management interface 502 implemented on the mobile device 500, in accordance with various embodiments. The ISP setting panel 550 enables the ISP franchisee account to configure its account settings. For example, the ISP setting panel 550 displays the name of the ISP franchisee account and/or a photo of the ISP franchisee account. In some embodiments, the ISP setting panel 550 can include interactive elements to attach a photo or capture a photo of the ISP franchisee account to upload to the ISP platform system.

The ISP setting panel 550 can display the company name of the ISP franchisee account. The ISP setting panel 550 can include interactive elements to edit the company name. The ISP setting panel 550 can display a phone number (e.g., a mobile phone number) of the ISP franchisee account. The ISP setting panel 550 can include interactive elements to edit the phone number. The ISP setting panel 550 can include interactive elements to edit a password associated with the ISP franchisee account.

FIG. 6A is an example screenshot illustrating an application services panel 610 of an ISP consumer interface 602 implemented on a mobile device 600A, in accordance with various embodiments. The application services panel 610 displays a list of application services available to a subscriber account of an ISP platform system (e.g., the ISP platform system 300 of FIG. 3 and/or the ISP platform system 400 of FIG. 4). For example, the application services panel 610 can display interactive elements to open user interfaces specific to the application services (e.g., weather services, health-related services, social networking services, location-based services, messaging services, sports and entertainment services, educational services, or any combination thereof).

FIG. 6B is an example screenshot illustrating a message portal panel 620 of an ISP consumer interface 602 implemented on a mobile device 600B, in accordance with various embodiments. For illustrative purposes, the mobile device 600A and the mobile device 600B are shown as different devices. That is, the ISP consumer interface 602 can be implemented on different devices. In some embodiments, the ISP consumer interface 602 can be implemented on the same devices.

The message portal panel 620 can present a message application to facilitate the subscriber account to send messages to and from the mobile device 600B. For example, the subscriber account can exchange messages with other subscriber accounts. In some embodiments, automated messages from the ISP platform system can also be displayed in the message portal panel 620. In the illustrated example, the ISP platform system generates an alert message to warn the subscriber account that its daily data plan is about to expire. In some embodiments, the ISP platform system can generate an alert message to warn the subscriber account that it is about to go over (e.g., surpass) the data limit of its data plan.

FIG. 6C is an example screenshot illustrating a subscriber account panel 630 of an ISP consumer interface 602 implemented on a mobile device 600C, in accordance with various embodiments. The mobile device 600C can be the same or different from the mobile device 600A and/or the mobile device 600B. The subscriber account panel 630 can display similar information as the subscriber management panel 520 of FIG. 5, except the subscriber account panel 630 is from the perspective of the subscriber account. The subscriber account panel 630 displays account information associated with the subscriber account. For example, the subscriber account panel 630 can display network usage accounting information associated with the subscriber account, usage charges based on the network usage accounting, data plan associated with the subscriber account, devices authenticated to use the ISP platform system's services, or any combination thereof. In several embodiments, the subscriber account panel 630 can also present interactive elements (e.g., buttons, drop-down list, dials, etc.) to request addition, removal, or modification of a data plan of the subscriber account. In the illustrated example, the subscriber management panel 520 displays an interactive element to "Request More Data."

Figure 7:
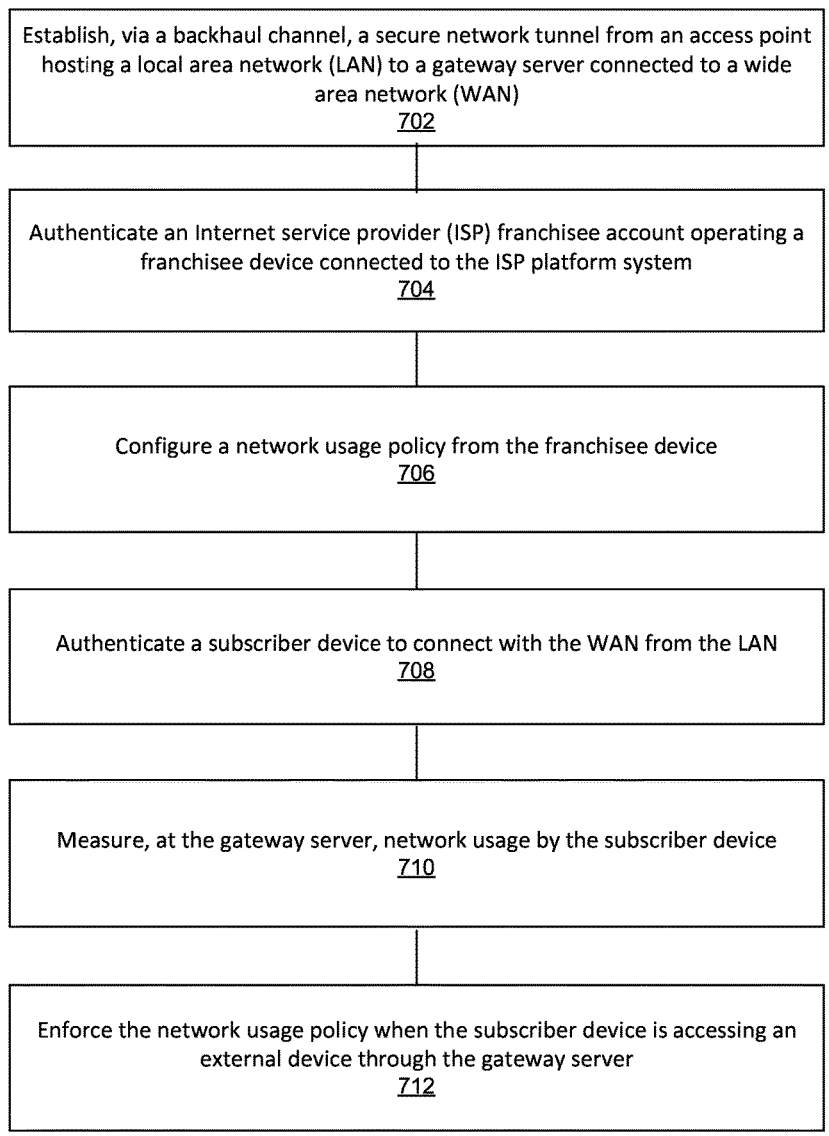
FIG. 7 is a flow chart illustrating a method of providing an ISP platform system, in accordance with various embodiments.

FIG. 7 is a flow chart illustrating a method 700 of providing an ISP platform system (e.g., the ISP platform system 300 of FIG. 3 and/or the ISP platform system 400 of FIG. 4), in accordance with various embodiments. At step 702, the ISP platform system can establish, via a backhaul channel, a secure network tunnel from an access point hosting a local area network (LAN) to a gateway server connected to a wide area network (WAN). For example, the backhaul channel can be established by satellite, drone, microwave dishes, train, or any combination thereof. The gateway server can be connected to a web tier system and a database tier system. For example, the access point can provide a Wi-Fi network and/or a cellular network as the LAN. The access point can include a Wi-Fi transceiver and/or a cellular transceiver.

At step 704, the ISP platform system can authenticate an ISP franchisee account operating a franchisee device (e.g., a mobile device, a stationary computing device, or other computing device) connected to the ISP platform system. For example, the franchisee device can be connected to the LAN via the access point. In this example, the franchisee device can access the secure network tunnel via the access point.

At step 706, the ISP platform system can configure a network usage policy from the franchisee device. For example, the web tier system can generate an ISP management interface (e.g., the ISP management interface of FIGS. 5A-5E) and an ISP consumer interface (e.g., the ISP consumer interface of FIGS. 6A-6C). The ISP franchisee account can use the franchisee device to access, via the secure network tunnel, the ISP management interface provided from the web tier system to configure the network usage policy. For example, configuring the network usage policy can include adding or modifying a data plan associated with a subscriber account. In some embodiments, the web tier system can be part of the gateway server.

In some embodiments, an instance of the ISP management interface can be generated as the access point (e.g., when the backhaul channel is unavailable). In these embodiments, the configuration of the network usage policy can be cached in the access point and then, when the secure network tunnel is available, shared with the gateway server, the web tier system, and/or the data tier system. In these embodiments, the ISP franchisee account can configure the network usage policy even when the secure network tunnel via the backhaul channel is unavailable. The sharing of the modifications to the network usage policy ensures that, once the backhaul channel is available, the gateway server that enforces the network usage policy is updated accordingly.

At step 708, the ISP platform system can authenticate a subscriber device to connect with the WAN from the LAN. For example, authenticating the subscriber device includes verifying that the subscriber device can provide an identifier of a subscriber account and its associated password. In another example, authenticating the subscriber device includes verifying that the subscriber device is listed in a subscriber database as being associated with the subscriber account. In some embodiments, authenticating the subscriber device also includes verifying that the subscriber account has a non-expired data plan. In some embodiments, the ISP platform system can authenticate the subscriber device at the access point to enable access to the gateway server. In some embodiments, the ISP platform system can authenticate the subscriber device at the gateway server to enable access to an application service in a web tier server or another destination in the WAN.

In response to authenticating the subscriber device, the gateway server can present a subscriber captive portal to the subscriber device. The subscriber captive portal provides one or more links to a free basic services interface and/or a subscriber account portal. In response to authenticating the franchisee device, the gateway server can present an ISP manager captive portal to the franchisee device.

At step 710, the ISP platform system can measure, at the gateway server, network usage. This way, the ISP platform system can keep an accounting of the network usage by the subscriber account associated with the subscriber device. At step 712, the gateway server can enforce the network usage policy when the subscriber device is accessing an external device (e.g., the web tier server or another destination in the WAN) through the gateway server via the secure network tunnel. For example, the gateway server can enforce the network usage policy based on the accounting of the network usage. Further, the web tier server can implement a policy and charging rules function (PCRF). The PCRF can include business logics for computing the charging rates for service request activities from the subscriber device to the web tier server. The PCRF can determine a charging rate, in real-time, as the subscriber user utilizes one or more application services in the web tier server.

Figure 8:
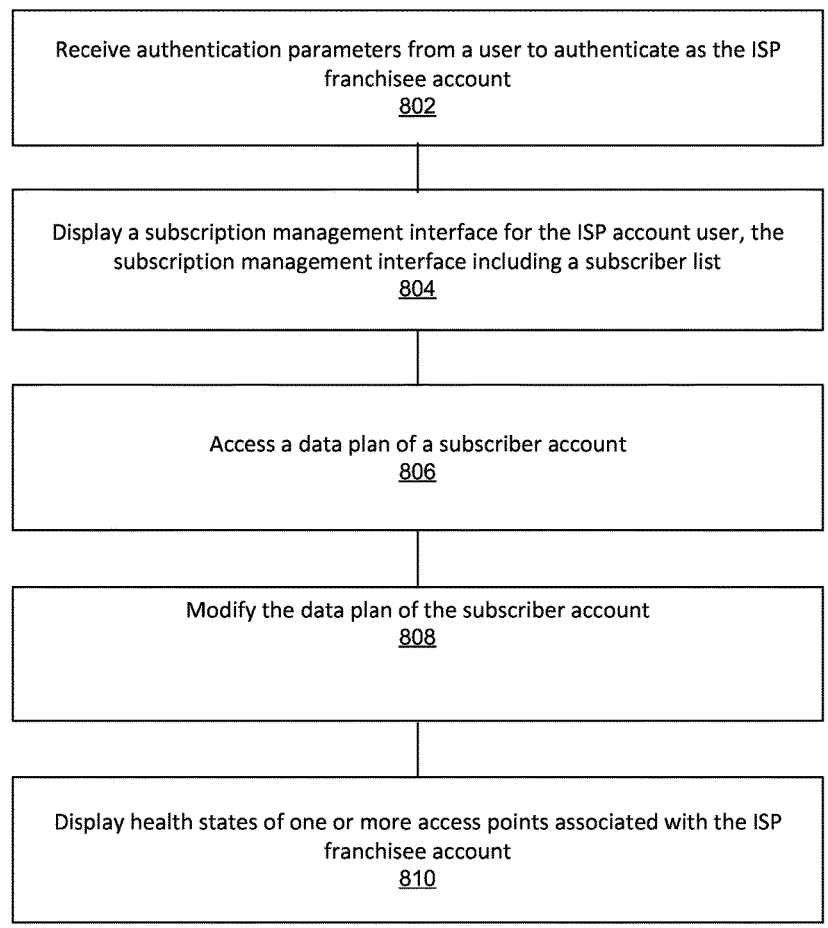
FIG. 8 is a flow chart illustrating a method of operating a mobile device logged in to an ISP platform system as an ISP franchisee account, in accordance with various embodiments.

FIG. 8 is a flow chart illustrating a method 800 of operating a mobile device logged in to an ISP platform system (e.g., the ISP platform system 300 of FIG. 3 and/or the ISP platform system 400 of FIG. 4) as an ISP franchisee account, in accordance with various embodiments. The mobile device can implement an ISP franchisee application. The mobile application can be connected to a local area network (LAN) established by an access point. A network tunnel can be established between the access point and a gateway server connected to a wide area network (WAN). For example, the WAN can be the Internet. The gateway server can be connected to a web tier system providing one or more application services to the ISP franchisee account.

At step 802, the ISP franchisee application can receive authentication parameters from a user to authenticate the ISP franchisee account. In some embodiments, the ISP franchisee application passes the authentication parameters to a gateway server for authentication. In some embodiments, the ISP franchisee application passes the authentication parameters to an access point for authentication.

At step 804, the ISP franchisee application displays a subscription management interface (e.g., generated by the ISP franchisee application or downloaded from a franchisee management service engine, or a combination thereof) for the ISP franchisee account. The subscription management interface can display a subscriber list associated with the ISP franchisee account. The ISP franchisee application can receive the subscriber list from a web tier system implementing an ISP franchisee application service. Step 804 can include ranking the subscriber list based on recent network usage, estimated data plan expiration time, frequency of network usage, credit history, payment made, or any combination thereof, associated with subscriber account in the subscriber list. This ranking can be performed on the ISP franchisee application or on the web tier system.

At step 806, the ISP franchisee application can access, via the network tunnel, a data plan of the subscriber account. For example, the ISP franchisee application can access the data plan from the franchisee management service (e.g., the ISP franchisee service engine 424 of FIG. 4) provided by an application server (e.g., the web tier system 402 of FIG. 4) coupled to the gateway server. At step 808, the ISP franchisee application can modify, via the network tunnel, the data plan of the subscriber account. For example, the ISP franchisee application can upload the modification to the franchisee management service and subsequently to a subscriber database in a database tier server coupled to the application server. The ISP franchisee application can modify the data plan in response to receiving a user interaction with the subscription management interface.

At step 810, the ISP franchisee application can identify health states of one or more access points associated with the ISP franchisee account. For example, the ISP franchisee application can download the health state information from a network management engine (e.g., the network management engine 336 of FIG. 3) of the application server.

Figure 9:
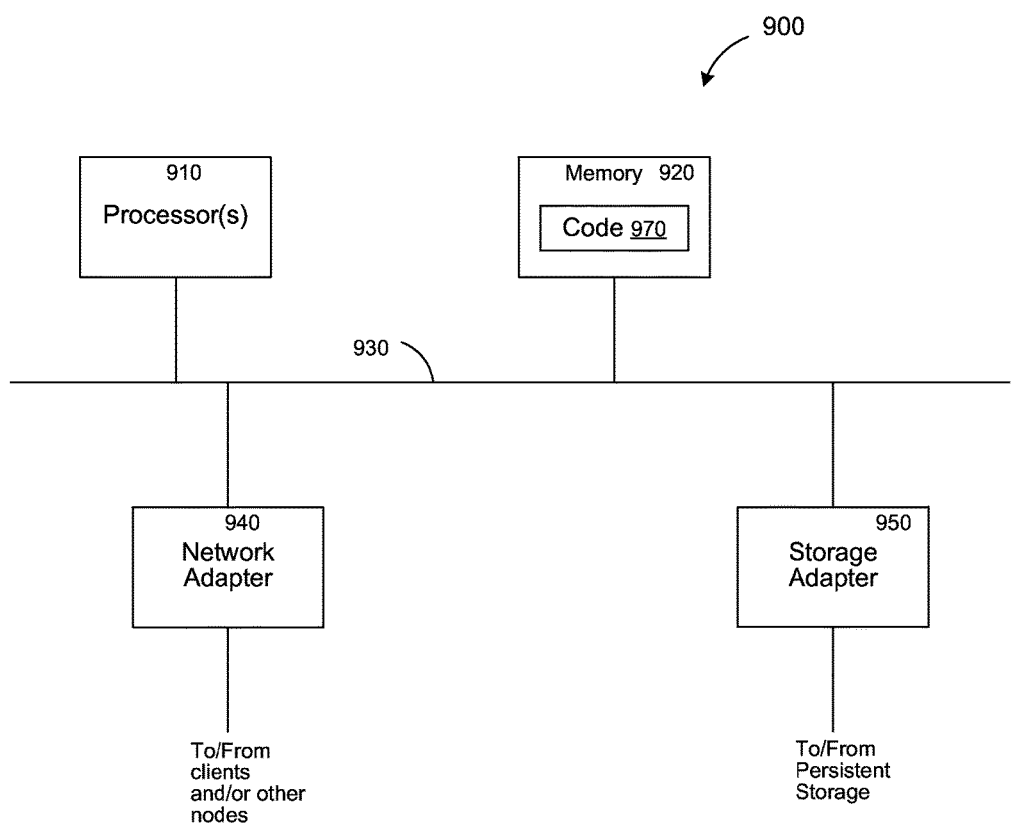
FIG. 9 is a block diagram of an example of a computing device, which may represent one or more computing device or server described herein, in accordance with various embodiments.

FIG. 9 is a block diagram of an example of a computing device 900, which may represent one or more computing device or server described herein, in accordance with various embodiments. The computing device 900 can be one or more computing devices that implement the rural networking system 100 of FIG. 1, the ISP platform system 300 of FIG. 3, and/or the ISP platform system 400 of FIG. 4. The computing device 900 can execute at least part of the method 700 of FIG. 7 and/or the method 800 of FIG. 8. The computing device 900 includes one or more processors 910 and memory 920 coupled to an interconnect 930. The interconnect 930 shown in FIG. 9 is an abstraction that represents any one or more separate physical buses, pointto-point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the computing device 900 and thus controls the overall operation of the computing device 900. In certain embodiments, the processor(s) 910 accomplishes this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 920 is or includes the main memory of the computing device 900. The memory 920 represents any form of random access memory (RAM), read-only memory (ROM), flash memory, or the like, or a combination of such devices. In use, the memory 920 may contain a code 970 containing instructions according to the systems or methods disclosed herein.

Also connected to the processor(s) 910 through the interconnect 930 are a network adapter 940 and a storage adapter 950. The network adapter 940 provides the computing device 900 with the ability to communicate with remote devices, over a network and may be, for example, an Ethernet adapter or Fibre Channel adapter. The network adapter 940 may also provide the computing device 900 with the ability to communicate with other computers. The storage adapter 950 enables the computing device 900 to access a persistent storage, and may be, for example, a Fibre Channel adapter or SCSI adapter.

The code 970 stored in memory 920 may be implemented as software and/or firmware to program the processor(s) 910 to carry out actions described above. In certain embodiments, such software or firmware may be initially provided to the computing device 900 by downloading it from a remote system through the computing device 900 (e.g., via network adapter 940).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method comprising:
   maintaining, at an Internet Service Provider (ISP) platform system for each of a plurality of Internet service providers, a franchisee account, wherein:
      each of the plurality of Internet service providers has an access point hosting a local area network (LAN) to which a plurality of subscribers of the Internet service provider connect; and
      the ISP platform system comprises a gateway server connected to a wide area network (WAN);
   maintaining, at the ISP platform system for each of the plurality of Internet service providers, a plurality of subscriber accounts representing the plurality of subscribers of the Internet service provider;
   establishing, via a backhaul channel, a secure network tunnel between the gateway server and the access point of one of the plurality of Internet service providers;
   authenticating, at the ISP platform system using the franchisee account of the one of the plurality of Internet service providers, a first computing device connected to the access point of the one of the plurality of Internet service providers as belonging to the one of the plurality of Internet service providers;
   enabling, at the ISP platform system, the one of the plurality of Internet service providers to configure, via the first computing device, a network usage policy that controls implementation of at least one usage constraint that should be applied at the gateway server when one or more of the plurality of subscribers of the one of the plurality of Internet service providers accesses the WAN via the secure network tunnel;
   authenticating, at the ISP platform system using one of the plurality of subscriber accounts maintained for the one of the plurality of Internet service providers, a second computing device connected to the access point of the one of the plurality of Internet service providers as belonging to a subscriber of the one of the plurality of Internet service providers; and enforcing, at the gateway server while the second computing device accesses the WAN via the secure network tunnel, the at least one usage constraint controlled by the network usage policy.

2. The computer-implemented method of claim 1, wherein the access point of the one of the plurality of Internet service providers provides a Wi-Fi network, a cellular network, or a combination thereof, to establish the LAN.

3. The computer-implemented method of claim 1, wherein enabling the one of the plurality of Internet service providers to configure the network usage policy is performed at least in part at the gateway server.

4. The computer-implemented method of claim 1, wherein enabling the one of the plurality of Internet service providers to configure the network usage policy includes enabling the one of the plurality of Internet service providers to configure the network usage policy at the access point of the one of the plurality of Internet service providers and propagating the configured network usage policy to the gateway server thereafter.

5. The computer-implemented method of claim 1, further comprising:
establishing, via a second backhaul channel, an additional secure network tunnel between the gateway server and the access point of a second one of the plurality of Internet service providers;
authenticating, at the ISP platform system using the franchisee account of the second one of the plurality of Internet service providers, a third computing device connected to the access point of the second one of the plurality of Internet service providers as belonging to the second one of the plurality of Internet service providers;
enabling, at the ISP platform system, the second one of the plurality of Internet service providers to configure, via the third computing device connected to the access point of the second one of the plurality of Internet service providers, an additional network usage policy that controls implementation of at least one additional usage constraint that should be applied at the gateway server when one or more of the plurality of subscribers of the second one of the plurality of Internet service providers accesses the WAN via the additional secure network tunnel;
authenticating, at the ISP platform system using one of the plurality of subscriber accounts maintained for the second one of the plurality of Internet service providers, a fourth computing device connected to the access point of the second one of the plurality of Internet service providers as belonging to a subscriber of the second one of the plurality of Internet service providers; and
enforcing, at the gateway server while the fourth computing device accesses the WAN via the additional secure network tunnel, the at least one additional usage constraint controlled by the additional network usage policy.

6. The computer-implemented method of claim 1, further comprising enabling the second computing device to access an application service in an external device or another destination in the WAN.

7. The computer-implemented method of claim 1, further comprising measuring network usage at the gateway server.

8. The computer-implemented method of claim 1, further comprising presenting a subscriber captive portal to the second computing device from a web tier server, in response to authenticating the second computing device.

9. The computer-implemented method of claim 8, wherein the subscriber captive portal provides access to free basic services, a subscriber account portal, or any combination thereof.

10. The computer-implemented method of claim 8, wherein the web tier server implements a policy and charging rules function (PCRF) to determine, in real-time, an accounting of charges associated with using the web tier server according to the network usage policy.

11. The computer-implemented method of claim 1, further comprising, in response to authenticating the first computing device, displaying an ISP manager captive portal at the first computing device.

12. The computer-implemented method of claim 11, wherein the ISP manager captive portal provides a subscriber list panel, a subscriber management panel, a franchisee account balance management panel, a network monitor panel, an ISP setting panel, or any combination thereof.

13. An Internet Service Provider (ISP) platform system comprising:
a franchisee account database configured to maintain, for each of a plurality of Internet service providers, a franchisee account, wherein each of the plurality of Internet service providers has an access point hosting a local area network (LAN) to which a plurality of subscribers of the Internet service provider connect;
a subscriber account database configured to maintain, for each of the plurality of Internet service providers, a plurality of subscriber accounts representing the plurality of subscribers of the Internet service provider;
a network backhaul system configured to establish, via a backhaul channel, a secure network channel between the access point of one of the plurality of Internet service providers and a gateway server connected to a wide area network (WAN);
a franchisee management system configured to:
authenticate, using the franchisee account of the one of the plurality of Internet service providers, a first computing device connected to the access point of the one of the plurality of Internet service providers as belonging to the one of the plurality of Internet service providers; and
enable the one of the plurality of Internet service providers to configure, via the first computing device, a network usage policy that controls implementation of at least one usage constraint that should be applied at the gateway server when one or more of the plurality of subscribers of the one of the plurality of Internet service providers accesses the WAN via the secure network tunnel;
a subscriber management system configured to authenticate, using one of the plurality of subscriber accounts maintained for the one of the plurality of Internet service providers, a second computing device connected to the access point of the one of the plurality of Internet service providers as belonging to a subscriber of the one of the plurality of Internet service providers; and
the gateway configured to:
enforce, while the second computing device accesses the WAN via the secure network tunnel, the at least one usage constraint controlled by the network usage policy;

measure network usage of the second computing device when the second computing device is accessing the gateway server; and provide, for the second computing device, access to the WAN.

14. The ISP platform system of claim 13, wherein the gateway server is further configured to provide network integrity validation and repair.

15. The ISP platform system of claim 13, further comprising a web tier server configured to provide an application service to the second computing device; and wherein the gateway server is configured to provide access, to the web tier server, for the second computing device.

16. The ISP platform system of claim 15, wherein the web tier server is configured to provide a subscriber account configuration service, a weather service, an educational service, a health related service, a location-based service, an entertainment service, a new service, a search engine service, a dictionary service, an encyclopedia service, or any combination thereof, to the second computing device.

17. The ISP platform system of claim 15, wherein the web tier server is configured to provide an ISP management service for configuring, by the one of the plurality of Internet service providers, a data plan of the one of the plurality of subscriber accounts maintained for the one of the plurality of Internet service providers, wherein the data plan specifies network usage capacity available within a time window.

18. A computer-readable storage memory storing computer-executable instructions that, when executed by a computing system, cause the computing system to perform operations comprising:

maintaining, at an Internet Service Provider (ISP) platform system for each of a plurality of Internet service providers, a franchisee account, wherein:

each of the plurality of Internet service providers has an access point hosting a local area network (LAN) to which a plurality of subscribers of the Internet service provider connect; and the ISP platform system comprises a gateway server connected to a wide area network (WAN);

maintaining, at the ISP platform system for each of the plurality of Internet service providers, a plurality of subscriber accounts representing the plurality of subscribers of the Internet service provider;

establishing, via a backhaul channel, a secure network tunnel between the gateway server and the access point of one of the plurality of Internet service providers;

authenticating, at the ISP platform system using the franchisee account of the one of the plurality of Internet service providers, a first computing device connected to the access point of the one of the plurality of Internet service providers as belonging to the one of the plurality of Internet service providers;

enabling, at the ISP platform system, the one of the plurality of Internet service providers to configure, via the first computing device, a network usage policy that controls implementation of at least one usage constraint that should be applied at the gateway server when one or more of the plurality of subscribers of the one of the plurality of Internet service providers accesses the WAN via the secure network tunnel;

authenticating, at the ISP platform system using one of the plurality of subscriber accounts maintained for the one of the plurality of Internet service providers, a second computing device connected to the access point of the one of the plurality of Internet service providers as belonging to a subscriber of the one of the plurality of Internet service providers; and enforcing, at the gateway server while the second computing device accesses the WAN via the secure network tunnel, the at least one usage constraint controlled by the network usage policy.

19. The computer-readable storage memory of claim 18, wherein the operations further comprise identifying health states of the access points of the one of the plurality of Internet service providers.

20. The computer-readable storage memory of claim 18, wherein the operations further comprise ranking two or more subscriber accounts in a subscriber list, the ranking based on recent network usage, estimated data plan expiration time, frequency of network usage, credit history, payment made, or any combination thereof, associated with each subscriber account in the subscriber list.

* * * * *

UNITED STATES PATENT AND TRADEMARK OFFICE
CERTIFICATE OF CORRECTION

PATENT NO. : 10,142,172 B2
APPLICATION NO. : 14/806352
DATED : November 27, 2018
INVENTOR(S) : Viswanath Poosala et al.

It is certified that error appears in the above-identified patent and that said Letters Patent is hereby corrected as shown below:

In Column 20, Line 63, Claim 13, after "gateway" insert -- server --.

Signed and Sealed this
Twenty-ninth Day of January, 2019

Andrei Iancu
*Director of the United States Patent and Trademark Office*